(12) United States Patent (10) Patent No.: US 7,868,105 B2
Chung et al. (45) Date of Patent: Jan. 11, 2011

(54) POLYMERIZATION METHODS USING THE CATALYSTS

(75) Inventors: Young Keun Chung, Seoul (KR); Il Gu Jung, Chungcheongbuk-do (KR); Sung Ho Chun, Daejeon (KR); Young Whan Park, Daejeon (KR); Dai Seung Choi, Daejeon (KR); Sung Cheol Yoon, Daejeon (KR); TaeSun Lim, Daejeon (KR); Jungmin Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1029 days.

(21) Appl. No.: 11/581,470

(22) Filed: Oct. 17, 2006

(65) Prior Publication Data

US 2007/0123666 A1 May 31, 2007

(30) Foreign Application Priority Data

Oct. 17, 2005 (KR) ................ 10-2005-0097515
Oct. 16, 2006 (KR) ................ 10-2006-0100497

(51) Int. Cl.
*C08F 4/06* (2006.01)
*C08F 4/12* (2006.01)
*C08F 4/16* (2006.01)

(52) U.S. Cl. ....................................... 526/126
(58) Field of Classification Search .................. 526/126
See application file for complete search history.

(56) References Cited

U.S. PATENT DOCUMENTS 5,468,819 A 11/1995 Goodall et al.
6,455,650 B1 9/2002 Lipian et al.

OTHER PUBLICATIONS

Janiak, C. et al., "Metal catalysts for the vinyl polymerization of norbornene", Journal of Molecular Catalysis A: Chemical, 166 (2001), pp. 193-209.
Li et al., "Synthesis and evaluation of substituted pyrazoles palladium(II) complexes as ethylene polymerization catalysts", Journal of Organometallic Chemistry, 660 (2002), pp. 108-115.
Koprowski, M. et al., "Iminophosphine Palladium Complexes in Catalytic Stille Coupling Reactions: From Monomers to Dendrimers", Organometallics, 21 (2002), pp. 4680-4687.

Hennis, A.D. et al., "Novel, Efficient, Palladium-Based System for the Polymerization of Norbornene Derivatives: Scope and Mechanism", Organometallics, 20 (2001), pp. 2802-2812.

*Primary Examiner*—Ling-Siu Choi
*Assistant Examiner*—Sonya Wright
(74) *Attorney, Agent, or Firm*—McKenna Long & Aldridge LLP

(57) ABSTRACT

Provided is a method of preparing a cyclic olefin polymer by addition polymerization of a cyclic olefin monomer, the method including contacting a metal catalyst complex represented by Formula 1 below with a cyclic olefin monomer represented by Formula 2 below:

$$[M(L_1)_x(L'_2)_y(L_3)_z]_a[Ani]_b \quad \text{<Formula 1>}$$

wherein M is a Group X metal; $[M(L_1)_x(L'_2)_y(L_3)_z]$ is a cationic complex; $L_1$ is an anionic hydrocarbyl-containing ligand; $L'_2$ is a neutral ligand; $L_3$ is an N-heterocyclic carbene ligand; [Ani] is an anion capable of weakly coordinating with the metal M; x is 1 or 2; y is 0 to 4; z is 1 or 2; $2 \leq x+y+z \leq 6$; a and b are respectively the number of cations and the number of anions capable of weakly coordinating with the metal M and are each a number of 1-10 which is used to satisfy the net charge balance of the metal catalyst complex, and wherein for each of $L_1$, $L'_2$, and $L_3$, when a plurality of ligands are present in a molecule of the metal catalyst complex, the ligands may be the same or different, and

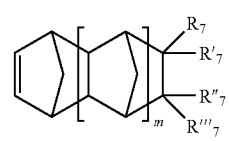

<Formula 2> wherein m is an integer of 0 to 4; and $R_7$, $R'_7$, $R''_7$, and $R'''_7$ are each independently a polar functional group or a nonpolar functional group.

According to the method of the present invention, a high molecular weight cyclic olefin addition polymer can be produced in a high yield even when using a polar functional group-containing cyclic olefin monomer. A polymer produced using the method shows good thermal stability.

14 Claims, 2 Drawing Sheets ated by [(1,5-cyclooctadiene)(CH$_3$)Pd(Cl)] and cocatalyzed by phosphine (PPh$_3$) and [Na]$^+$[B(3,5-(CF$_3$)$_2$C$_6$H$_3$)$_4$]$^-$.

POLYMERIZATION METHODS USING THE CATALYSTS

CROSS-REFERENCE TO RELATED PATENT APPLICATION

This application claims priority to Korean Application 10-2005-0097515 filed on Oct. 17, 2005, and Korean Application 10-2006-00100497 filed on Oct. 16, 2006, both of which are incorporated by reference, as if fully set forth herein.

BACKGROUND OF THE INVENTION

1. Field of the Invention

The present invention relates to a method of preparing a cyclic olefin polymer using a metal catalyst complex, and a polymer prepared using the method. More particularly, the present invention relates to a method of preparing a cyclic olefin addition polymer using a metal catalyst complex including an N-heterocyclic carbene (NHC) ligand, and a polymer prepared using the method.

2. Description of the Related Art

Cyclic olefin polymers, which are polymers composed of cyclic olefin monomers such as norbornene, have better transparency, heat resistance, and chemical resistance, and much lower birefringence and hygroscopicity, compared with conventional olefin-based polymers, and thus, can be widely applied as optical materials for CDs, DVDs, or POFs (Plastic Optical Fibers), information and electronic materials for capacitor films or low dielectrics, medical materials for low-absorbent syringes or blister packagings, etc. In particular, polynorbornenes are noncrystalline polymers which have a high glass transition temperature, a high refractive index, and a low dielectric constant, and thus, have been widely used as electronic materials. Much research about polynorbornenes has been actively done by Heitz et al [(a) T. F. A. Haselwander, W. Heitz, S. A. Krugel, J. H. Wendorff, *Macromolecules*, 1997, 30, 534. (b) T. F. A. Haselwander, W. Heitz, S. A. Krugel, J. H. Wendorff, *Macromol. Chem, Phys.* 1996, 197, 3435.].

Norbornene monomers can be easily polymerized since they can be easily converted to polymers in the presence of various palladium or nickel complexes and cocatalysts [Ni: (a) WO95 14048A1 (1995), B. F. Goodrich Co., invs.: B. L. Goodall, G. M. Benedikt, L. H. Mcintosh III, D. A. Barnes; *Chem. Abstr.* 1995, 123, 341322p. (b) EP 445755 A2 (1991), Idemitsu Kosan Co. Ltd., invs. : H. Maezawa, J. Aiura, S. Asahi. *Chem. Abstr* 1991, 115, 256943g., Pd: (a) U.S. Pat. No. 3,330,815 (1967), Union Carbide Corp., invs. : J. E. McKeon, P. S. Starcher; *Chem. Abstr.* 1967, 67, 64884g. (b) F. Hojabri, M. M. Mohaddes, A. Talab, *Polymer* 1976, 17, 710].

However, norbornene monomers having a saturated hydrocarbon ring structure are hardly soluble in organic solvents, and are inferior in adsorptivity to metals, etc. which is required for use of them as electronic materials, thereby limiting the applications of the norbornene monomers. In view of these problems, extensive research has been actively conducted. In order to easily change the physical properties of polymers, for example, to improve the solubility of conventional polynorbornenes, and to provide new physical properties to the polynorbornenes, a method of modifying the chemical structures of norbornene monomers and a method of incorporating new functional groups to norbornene monomers have been proposed. In particular, low solubility in organic solvents of norbornene monomers can be easily overcome by incorporating polar functional groups to the norbornene monomers. Alternatively, research about norborene/ ethane copolymerization [(a) H. Cherdron, M. J. Brekner, F. Osan, *Angew. Makromol. Chem.* 1994, 223, 121. (b) M. Arndt, I. Beulich, *Macromol. Chem. Phys.* 1998, 199, 1221] or norbornene/functionalized norbornene copolymerization [T. F. A. Haselwander, W. Heitz, M. Maskos, *Macromol, Rapid. Commun.* 1997, 198, 3963] has been actively conducted. These copolymerization reactions can also contribute to better adsorption of copolymers with other objects.

A catalyst mainly used in the preparation of cyclic olefin polymers was a catalyst complex including, as a cocatalyst, an organic phosphine compound that has been used as a σ electron donor ligand. For example, U.S. Pat. No. 6,455,650 discloses a method of polymerizing a functionalized norbornene-based monomer in the presence of a catalyst complex represented by [(R')$_z$M(L')$_x$(L")$_y$]$_b$[WCA]$_d$ where phosphine and a hydrocarbyl (e.g., allyl)-containing hydrocarbon are used as ligands. Sen, et al. [Organometallics 2001, Vol. 20, 2802-2812] reported ester norbornene polymerization catalyzed by [(1,5-cyclooctadiene)(CH$_3$)Pd(Cl)] and cocatalyzed by phosphine (PPh$_3$) and [Na]$^+$[B(3,5-(CF$_3$)$_2$C$_6$H$_3$)$_4$]$^-$.

However, separate addition of a phosphine cocatalyst requires a separate step for converting a catalyst precursor to an activated catalyst and significantly reduces catalyst activity in the presence of a polar functional group-containing cyclic olefin monomer.

Recently, preparation of polar functional group-containing norbornene polymers in the presence of phosphonium compounds as cocatalysts have been disclosed in Korean Patent Laid-Open Publication Nos. 2004-0052612 and 2004-0074307.

For synthesis of an aromatic olefin monomer (e.g.: stilbene), ER 0721953B1 discloses a metal catalyst complex including an N-heterocyclic carbene (NHC) ligand instead of a phosphine ligand. However, the working examples of this patent document disclose that the NHC ligand is mainly substituted simply by an alkyl group or a sulfonated alkyl group.

As one of various methods for improving the performance of metal catalysts, a method of partially substituting ligands with various functional groups has been proposed. The method is considering an electronic effect of a ligand. The improvement of the performance of catalysts through adjustment of the electronic effect of a ligand has been reported in several documents. For example, an improvement of catalyst activity through a ligand electronic effect adjusted by changing a substituent of a Grubbs ruthenium carbene catalyst ligand has been reported [(a) Trnka, T. M.; Grubbs, R. H. Acc. Chem. Res. 2001, 34, 18-29. (b) Love, J. A.; Sanford, M. S.; Day, M. W.; Grubbs, R. H. J. Am. Chem. Soc. 2003, 125, 10103-10109].

With respect to catalysts used in polymer synthesis, Waymouth found that the electronic effect of a ligand plays an important role in adjusting the stereoselectivity of propylene polymerization in the presence of a zirconocene catalyst [Lin, S.; Hauptman, E.; Lal, T. K.; Waymouth, R. M.; Quan, R. W.; Ernst, A. B. J. Mol. Catal. A: Chem. 1998, 136, 23-33]. Coates reported that when carbon dioxide (CO$_2$) and epoxide are copolymerized in the presence of a β-diiminate zinc alkoxide catalyst, partial substitution of a ligand with a cyano group enables to significantly increase a polymerization rate [Moore, D. R.; Cheng, M.; Lobkovsky, E. B.; Coates, G. W. Angew. Chem., Int. Ed. 2002, 41, 2599-2602].

However, until now, there was no report about a further improvement in performance of metal catalysts through a ligand electronic effect achieved by partially substituting a NHC ligand with various functional groups affecting ligand electron density. Therefore, it is necessary to develop a new polymerization method of preparing a cyclic olefin polymer using a metal catalyst complex that shows better performance by substituting a NHC ligand with various functional groups.

SUMMARY OF THE INVENTION

The present invention provides a method of preparing a cyclic olefin polymer using a new metal catalyst complex.

The present invention also provides a cyclic olefin polymer prepared using the method.

According to an aspect of the present invention, there is provided a method of preparing a cyclic olefin polymer by addition polymerization of a cyclic olefin monomer, the method including contacting a metal catalyst complex represented by Formula 1 below with a cyclic olefin monomer represented by Formula 2 below:

$$[M(L_1)_x(L'_2)_y(L_3)_z]_a[Ani]_b$$ <Formula 1> wherein M is a Group X metal,
$[M(L_1)_x(L'_2)_y(L_3)_z]$ is a cationic complex,
$L_1$ is an anionic hydrocarbyl-containing ligand,
$L'_2$ is a neutral ligand,
$L_3$ is an N-heterocyclic carbene ligand,
[Ani] is an anion capable of weakly coordinating with the metal M,
x is 1 or 2; y is 0 to 4; z is 1 or 2; $2 \leq x+y+z \leq 6$,
a and b are respectively the number of cations and the number of anions capable of weakly coordinating with the metal M and are each a number of 1-10 which is used to satisfy the net charge balance of the metal catalyst complex, wherein for each of $L_1$, $L'_2$, and $L_3$, when a plurality of ligands are present in a molecule of the metal catalyst complex, the ligands may be the same or different, and

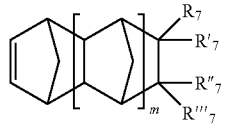

<Formula 2> wherein m is an integer of 0 to 4,
$R_7$, $R'_7$, $R''_7$, and $R'''_7$ are each independently a polar functional group or a nonpolar functional group, and
$R_7$, $R'_7$, $R''_7$, and $R'''_7$ may be connected to form a C4-C12 saturated or unsaturated cyclic group or a C6-C24 aromatic ring,
wherein the nonpolar functional group is selected from the group consisting of hydrogen; halogen; C1-C20 straight or branched alkyl, haloalkyl, alkenyl, or haloalkenyl; C3-C20 straight or branched alkynyl or haloalkynyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; and C7-C15 aralkyl which is unsubstituted or substituted by alkyl, alkenyl, alkynyl, halogen, haloalkyl, haloalkenyl, or haloalkynyl, but is not limited to the illustrated examples, and
wherein the polar functional group is a non-hydrocarbonaceous polar group including at least one of oxygen, nitrogen, phosphorus, sulfur, silicon, and boron, and is selected from the group consisting of:
—$R^8OR^9$, —$OR^9$, —$OC(O)OR^9$, —$R^8OC(O)OR^9$, —$C(O)R^9$, —$R^8C(O)R^9$, —$OC(O)R^9$, —$R^8C(O)OR^9$, —$C(O)OR^9$, —$R^8OC(O)R^9$, —$(R^8O)_k$—$OR^9$, —$(OR^8)_k$—$OR^9$, —$C(O)$—$O$—$C(O)R^9$, —$R^8C(O)$—$O$—$C(O)R^9$, —$SR^9$, —$R^8SR^9$, —$SSR^8$, —$R^8SSR^9$, —$S(=O)R^9$, —$R^8S(=O)R^9$, —$R^8C(=S)R^9$, —$R^8C(=S)SR^9$, —$R^8SO_3R^9$, —$SO_3R^9$, —$R^8N=C=S$, —$N=C=S$, —$NCO$, $R^8$—$NCO$, —$CN$, —$R^8CN$, —$NNC(=S)R^9$, —$R^8NNC(=S)R^9$, —$NO_2$, —$R^8NO_2$, —$P(R^9)_2$, —$R^8P(R^9)_2$, —$P(=O)(R^9)_2$, —$R^8P(=O)(R^9)_2$,

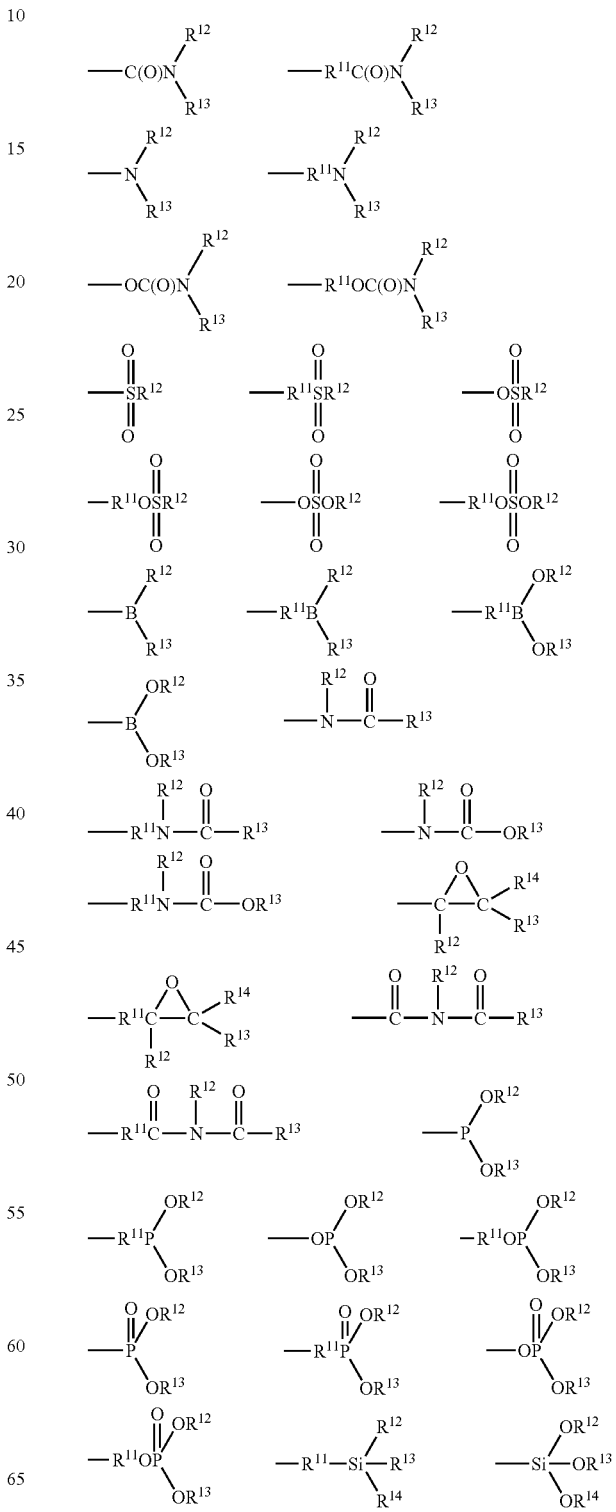

-continued

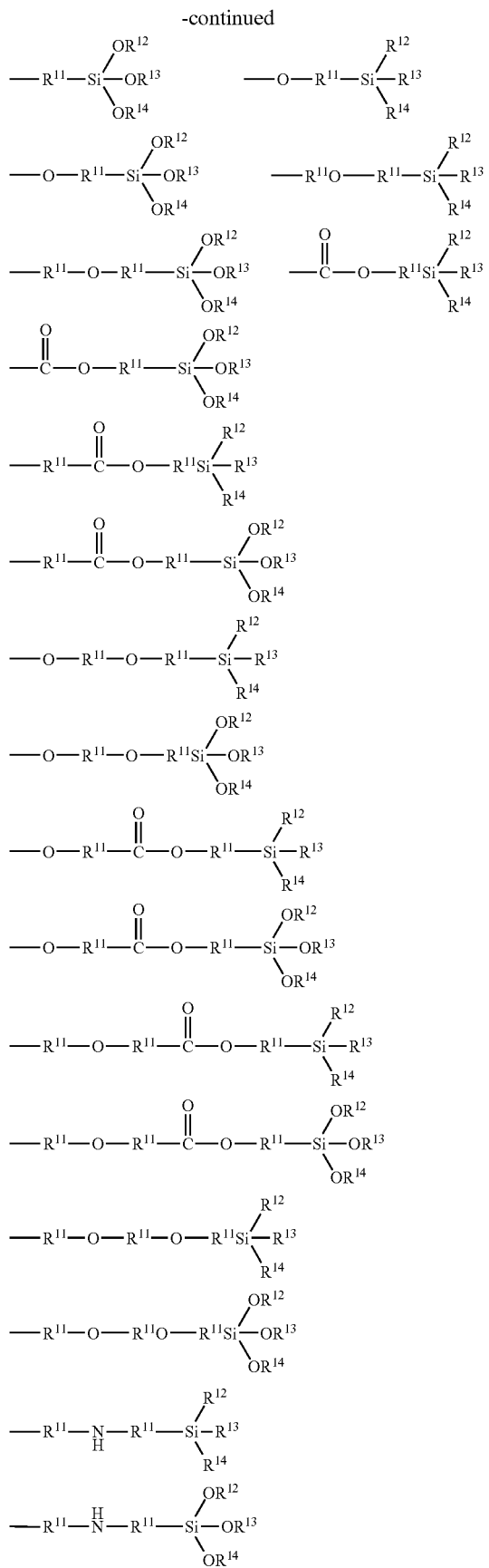

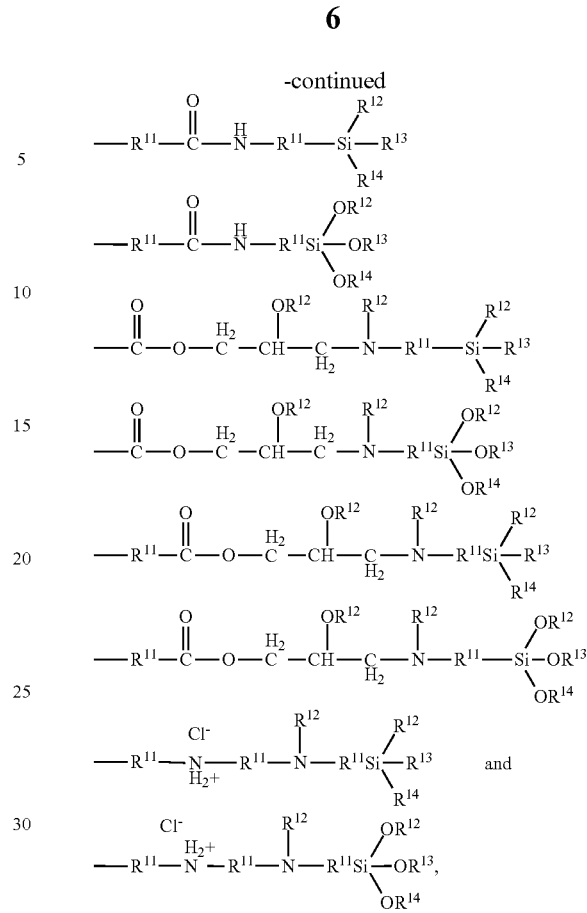

but is not limited to the illustrated examples.

In the polar functional group, $R^8$'s and $R^{11}$'s are each C1-C20 straight or branched alkylene, haloalkylene, alkenylene, or haloalkenylene; C3-C20 straight or branched alkynylene or haloalkynylene; C3-C12 cycloalkylene which is unsubstituted or substituted by alkyl, alkenyl, alkynyl, halogen, haloalkyl, haloalkenyl, or haloalkynyl; C6-C40 arylene which is unsubsituted or substituted by alkyl, alkenyl, alkynyl, halogen, haloalkyl, haloalkenyl, or haloalkynyl; or C7-C15 aralkylene which is unsubstituted or substituted by alkyl, alkenyl, alkynyl, halogen, haloalkyl, haloalkenyl, or haloalkynyl, $R^9$'s, $R^{12}$'s, $R^{13}$'s, and $R^{14}$'s are each hydrogen; halogen; C1-C20 straight or branched alkyl, haloalkyl, alkenyl, or haloalkenyl; C3-C20 straight or branched alkynyl or haloalkynyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; C7-C15 aralkyl which is unsubstituted or substituted by alkyl, alkenyl, alkynyl, halogen, haloalkyl, haloalkenyl, or haloalkynyl; or alkoxy, haloalkoxy, silyl, siloxy, aryloxy, haloaryloxy, carbonyloxy, or halocarbonyloxy, and k's are each an integer of 1 to 10.

According to an embodiment of the method of the present invention, the N-heterocyclic carbene ligand may be at least one selected from the group consisting of compounds represented by Formulae 3A through 3D below:

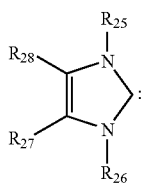

<Formula 3A>

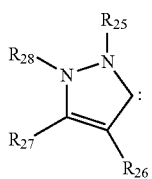

<Formula 3B>

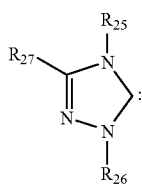

<Formula 3C>

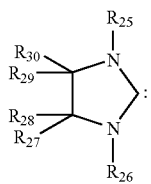

<Formula 3D> wherein $R_{25}$, $R_{26}$, $R_{27}$, $R_{28}$, $R_{29}$ and $R_{30}$ are each independently hydrogen, C1-C20 straight or branched alkyl, C3-C12 cycloalkyl, C2-C20 straight or branched alkenyl, C6-C15 cycloalkenyl, C3-C20 straight or branched allyl, C6-C30 aryl, C6-C30 heteroatom-containing aryl, or C7-C30 aralkyl, each of which may be substituted by at least one hydrocarbyl and/or heteroatom substituent selected from C1-C5 straight or branched alkyl or haloalkyl, C2-C5 straight or branched alkenyl or haloalkenyl, halogen, sulfur, oxygen, nitrogen, phosphorus, and a phenyl group. Here, the phenyl group may be optionally substituted by C1-C5 straight or branched alkyl or haloalkyl, halogen, or a heteroatom, but is not limited to the illustrated examples, and the alkenyl may include allyl or vinyl.

According to another embodiment of the method of the present invention, [Ani] is an anion capable of weakly coordinating with the Group X metal M, and may be one selected from the group consisting of borate, aluminate, [SbF₆]—, [PF₆]—, [AsF₆]—, perfluoroacetate [CF₃CO₂]—, perfluoropropionate [C₂F₅CO₂]—, perfluorobutyrate [CF₃CF₂CF₂CO₂]—, perchlorate [ClO₄]—, p-toluenesulfonate [p-CH₃C₆H₄SO₃]—, [SO₃CF₃]—, boratabenzene, and carborane which is unsubstituted or substituted by halogen.

According to another embodiment of the method of the present invention, the borate or the aluminate may be an anion represented by Formula 4A or 4B below:

[M'(R₃₀)₄]  <Formula 4A>

[M'(OR₃₀)₄]  <Formula 4B> wherein M' is boron or aluminum, and $R_{30}$'s are each independently halogen; C1-C20 straight or branched alkyl or alkenyl which is unsubstituted or substituted by halogen; C3-C12 cycloalkyl which is unsubstituted or substituted by halogen; C6-C40 aryl which is unsubstituted or substituted by halogen or hydrocarbon; C6-C40 aryl which is substituted by C3-C20 straight or branched trialkylsiloxy or C18-C48 straight or branched triarylsiloxy; or C7-C15 aralkyl which is unsubsituted or substituted by halogen or hydrocarbon.

According to another embodiment of the method of the present invention, the metal catalyst complex may be represented by Formula 5 below:

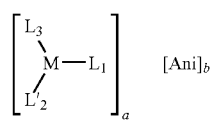

<Formula 5> wherein M, $L_1$, $L'_2$, $L_3$, [Ani], a, and b are as defined above.

According to another embodiment of the method of the present invention, the metal catalyst complex may be one selected from the group consisting of compounds represented by Formulae 6A through 6D below:

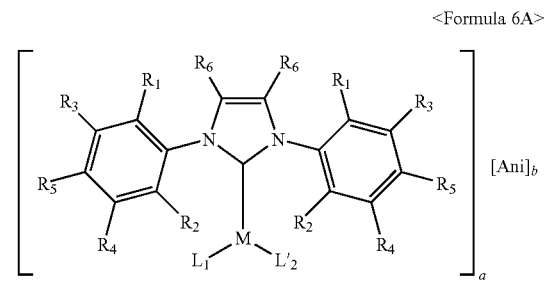

<Formula 6A>

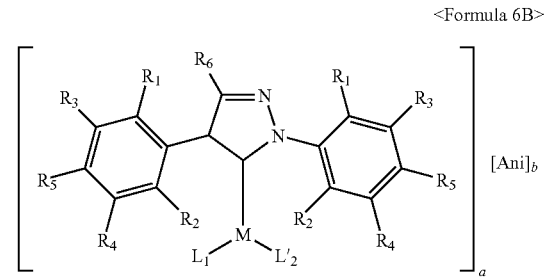

<Formula 6B>

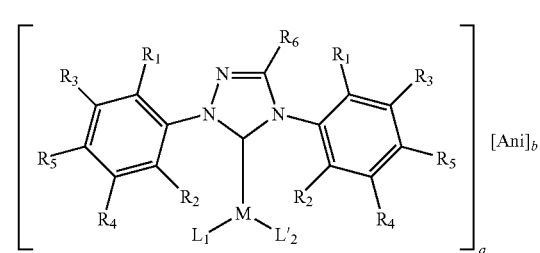

<Formula 6C>

-continued

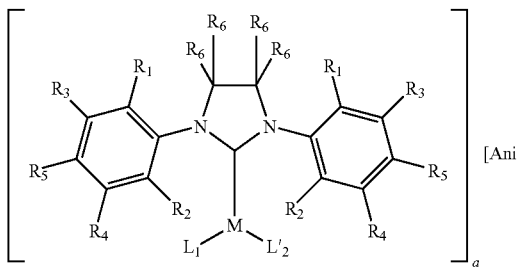
<Formula 6D> wherein M, $L_1$, $L'_2$, [Ani], a, and b are as defined above, and $R_1$ through $R_6$ are each independently hydrogen; halogen; C1-C20 straight or branched alkyl, alkoxy, allyl, alkenyl, or vinyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; C7-C15 aralkyl which is unsubstituted or substituted by alkyl, alkenyl, alkynyl, halogen, haloalkyl, haloalkenyl, or haloalkynyl; or C3-C20 alkynyl. Here, the alkenyl may include allyl or vinyl.

At least one of $R_1$ to $R_6$ is halogen or halogen-containing alkyl, aryl, aralkyl, or alkylaryl group.

According to another embodiment of the method of the present invention, the metal catalyst complex may be represented by Formula 7 below:

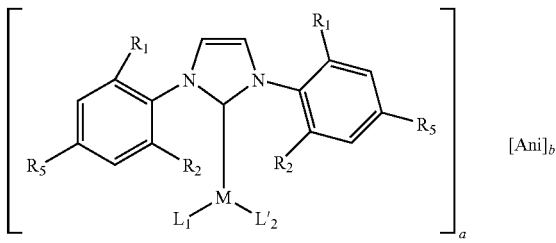
<Formula 7> wherein M, $L_1$, $L'_2$, [Ani], $R_1$, $R_2$, $R_5$, a, and b are as defined above.

According to another embodiment of the method of the present invention, the metal catalyst complex may be represented by Formula 8 below:

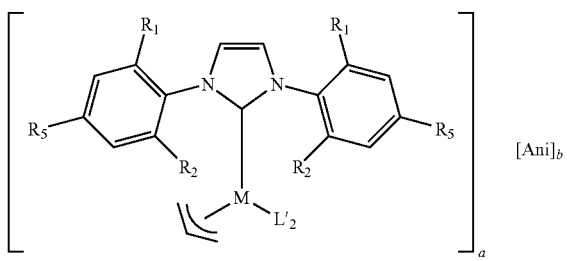
<Formula 8> wherein M, $L'_2$, [Ani], $R_1$, $R_2$, $R_5$, a, and b are as defined above, and

is C3 allyl, and at least one of $R_1$, $R_2$, and $R_5$ is halogen or halogen-containing alkyl, aryl, aralkyl, or alkylaryl group.

According to an embodiment of the method of the present invention, in the metal catalyst complexes used in the method of the present invention, at least one of $R_1$, $R_2$, and $R_5$ is halogen or a halogen-containing alkyl, aryl, aralkyl, or alkylaryl group.

According to another embodiment of the method of the present invention, the metal catalyst complex may be loaded on a microparticle support.

According to another embodiment of the method of the present invention, the microparticle support may be silica, titania, silica/chromia, silica/chromia/titania, silica/alumina, aluminum phosphate gel, silanized silica, silica hydrogel, montmorillonite clay, or zeolite.

According to another embodiment of the method of the present invention, the metal catalyst complex may be used as a solution obtained by dissolving it in an organic solvent selected from the group consisting of dichloromethane, dichloroethane, toluene, chlorobenzene, and a mixture thereof.

According to another embodiment of the method of the present invention, the metal catalyst complex may be introduced as a solid phase into a monomer solution.

According to another embodiment of the method of the present invention, the cyclic olefin addition polymer may be a cyclic olefin homopolymer having a polar functional group; a copolymer of cyclic olefin monomers having different polar functional groups; or a copolymer of a cyclic olefin monomer having a polar functional group and a cyclic olefin monomer having a nonpolar functional group.

According to another embodiment of the method of the present invention, a weight average molecular weight ($M_w$) of the cyclic olefin addition polymer may be 20,000 to 500,000.

According to an another aspect of the present invention, there is provided a cyclic olefin polymer prepared using the method, which is a cyclic olefin addition polymer having a weight average molecular weight of 20,000 to 500,000 and including a polar functional group.

According to an embodiment of the polymer of the present invention, the cyclic olefin polymer may be represented by Formula 9 below:

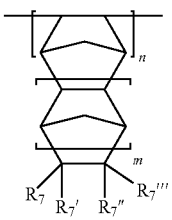
<Formula 9> wherein m, $R_7$, $R_7'$, $R_7''$, and $R_7'''$ are as defined above with respect to Formula 2 above, at least one of $R_7$, $R_7'$, $R_7''$, and $R_7'''$ is a polar functional group, and n is degree of polymerization and is a real number of 100 to 5,000.

According to another embodiment of the polymer of the present invention, the cyclic olefin polymer may be represented by Formula 10 below:

<Formula 10>

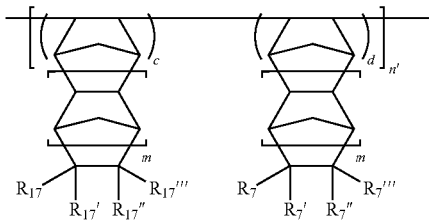

wherein m, $R_7$, $R_7'$, $R_7''$, and $R_7'''$ are as defined above with respect to Formula 2 above, at least one of $R_7$, $R_7'$, $R_7''$, and $R_7'''$ is a polar functional group, $R_{17}$, $R_{17}'$, $R_{17}''$, and $R_{17}'''$ are nonpolar functional groups, and are each independently selected from the group consisting of hydrogen; halogen; C1-C20 straight or branched alkyl, haloalkyl, alkenyl, or haloalkenyl; C3-C20 straight or branched alkynyl or haloalkynyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; and C7-C15 aralkyl which is unsubstituted or substituted by alkyl, alkenyl, alkynyl, halogen, haloalkyl, haloalkenyl, or haloalkynyl, m's may be different, n' is degree of polymerization and is a real number of 100 to 2,500, and c and d are molar ratios, c+d=1, $0.1 \leq c \leq 0.95$, and $0.05 \leq d \leq 0.9$.

According to another embodiment of the polymer of the present invention, the cyclic olefin polymer may be represented by Formula 11 below:

<Formula 11>

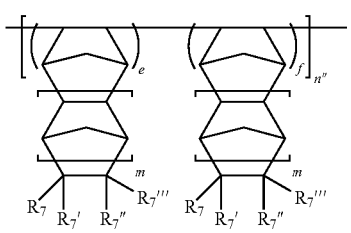

wherein m, $R_7$, $R_7'$, $R_7''$, and $R_7'''$ are as defined above with respect to Formula 2 above, at least one of $R_7$, $R_7'$, $R_7''$, and $R_7'''$ is a polar functional group, m's may be different, n'' is degree of polymerization and is a real number of 100 to 2,500, e and f are molar ratios, e+f=1, $0.1 \leq e \leq 0.9$ and $0.1 \leq f \leq 0.9$, and a repeating unit satisfying the molar ratio e is different from a repeating unit satisfying the molar ratio f.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
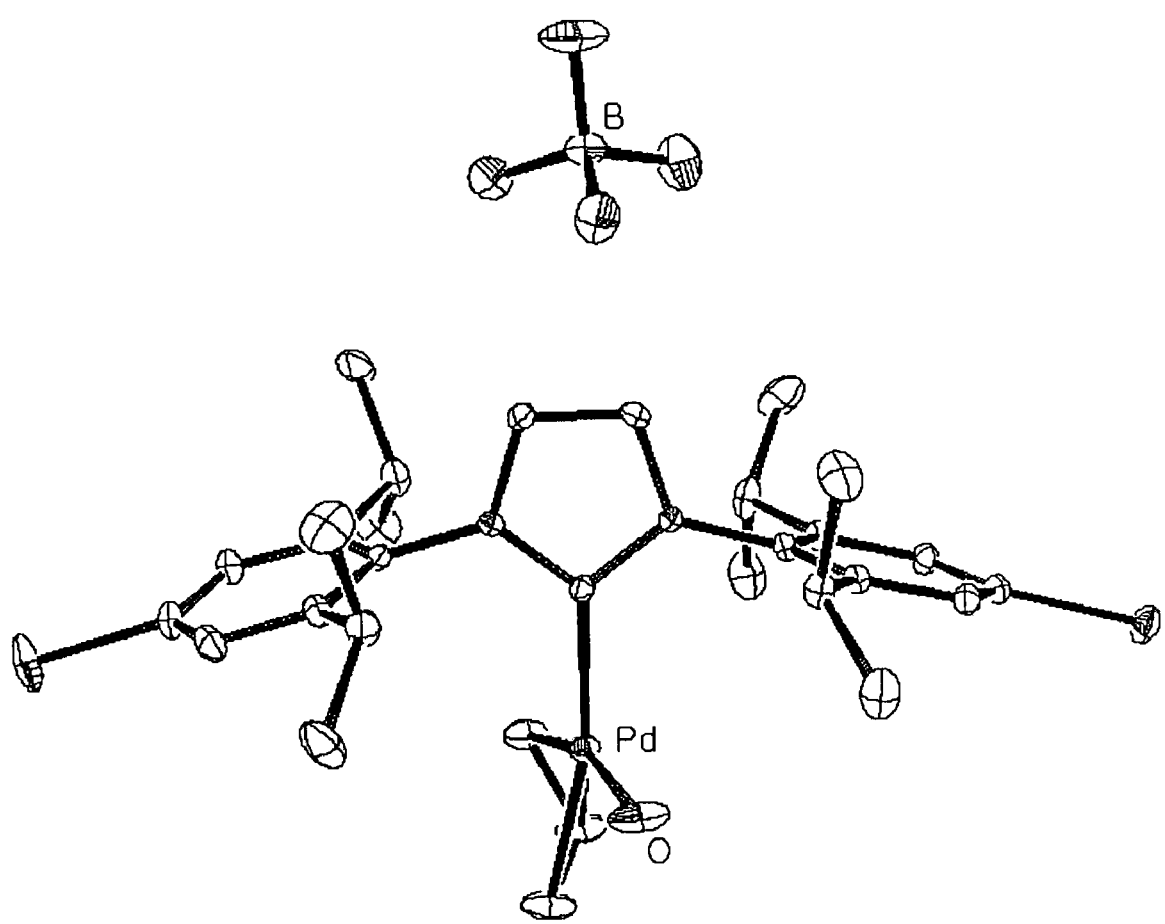
FIG. 1 is an X-ray crystallographic structure of a metal catalyst complex prepared in Example 10.

Hereinafter, the present invention will be described in more detail.

According to a method of preparing a cyclic olefin polymer of the present invention, a cyclic olefin addition polymer can be produced in a high yield even when using a cyclic olefin monomer with a polar functional group. A polymer prepared using the method exhibits good heat resistance.

The present invention provides a method of preparing a cyclic olefin polymer by addition polymerization of a cyclic olefin monomer, the method including contacting a metal catalyst complex represented by Formula 1 below with a cyclic olefin monomer represented by Formula 2 below.

$[M(L_1)_x(L'_2)_y(L_3)_z]_a[Ani]_b$      <Formula 1> wherein M is a Group X metal; $[M(L_1)_x(L'_2)_y(L_3)_z]$ is a cationic complex; $L_1$ is an anionic hydrocarbyl-containing ligand; $L'_2$ is a neutral ligand; $L_3$ is an N-heterocyclic carbene ligand; [Ani] is an anion capable of weakly coordinating with the metal M; x is 1 or 2; y is 0 to 4; z is 1 or 2; $2 \leq x+y+z \leq 6$; a and b are respectively the number of cations and the number of anions capable of weakly coordinating with the metal M and are each a number of 1-10 which is used to satisfy the net charge balance of the metal catalyst complex; and for each of $L_1$, $L'_2$, and $L_3$, when a plurality of ligands are present in a molecule of the metal catalyst complex, the ligands may be the same or different.

In more detail, in Formula 1 above, M may be any Group X metal. However, nickel or palladium is preferred.

In Formula 1 above, $L_1$ is an anionic hydrocarbyl-containing ligand. The anionic hydrocarbyl-containing ligand is any hydrocarbyl ligand which has a negative charge in its closed shell electron configuration when removed from the center metal M, and may be selected from a hydrogen ligand, a C1-C20 straight or branched alkyl ligand, a C5-C10 cycloalkyl ligand, a C2-C20 straight or branched alkenyl ligand, a C6-C15 cycloalkenyl ligand, an allyl ligand, or a normal form thereof; a C6-30 aryl ligand; a C6-C30 heteroatom-containing aryl ligand; and a C7-C30 aralkyl ligand, each of which may be optionally substituted by a hydrocarbyl and/or heteroatom substituent selected from C1-C5 straight or branched alkyl or haloalkyl, C2-C5 straight or branched alkenyl or haloalkenyl, halogen, sulfur, oxygen, nitrogen, phosphorus, and a phenyl group. Here, the phenyl group may be optionally substituted by C1-C5 straight or branched alkyl or haloalkyl, halogen, or a heteroatom, but is not limited to the illustrated examples, and the alkenyl may include vinyl.

The anionic hydrocarbyl-containing ligand may also be selected from ligands represented by R'C(O)O, R'C(O)CHC(O)R', R'C(O)S, R'C(S)O, R'C(S)S, R'O, and (R')$_2$N where R' is the same as the above-defined $L_1$.

The cycloalkyl ligand and the cycloalkenyl ligand may be monocyclic or polycyclic ligands, the aryl ligand may be a monocyclic ligand (e.g., phenyl) or a fused ring (e.g., naphthyl). Any cycloalkyl group, any cycloalkenyl group, and any aryl group may also be connected to form a fused ring.

In Formula 1 above, $L_2$ is a neutral ligand, and may include a reactive diluent, a reactive monomer, DMF, DMSO, C4-C10 aliphatic diene, C4-C10 cyclic aliphatic diene, more specifically, butadiene, 1,6-hexadiene, cyclooctadiene, etc. Water, chloroalkane, alcohol, ether, ketone, nitrite, arene, phosphine oxide, organic carbonate or ester, or the like is also preferred.

<Formula 2>

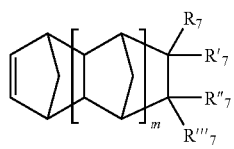

wherein m is an integer of 0 to 4, $R_7$, $R'_7$, $R''_7$, and $R'''_7$ are each independently a polar functional group or a nonpolar functional group, and $R_7$, $R'_7$, $R''_7$, and $R'''_7$ may be connected to form a C4-C12 saturated or unsaturated cyclic group or a C6-C24 aromatic ring.

The nonpolar functional group may be selected from the group consisting of hydrogen; halogen; C1-C20 straight or branched alkyl, haloalkyl, alkenyl, or haloalkenyl; C3-C20 straight or branched alkynyl or haloalkynyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; and C7-C15 aralkyl which is unsubstituted or substituted by alkyl, alkenyl, alkynyl, halogen, haloalkyl, haloalkenyl, or haloalkynyl, but is not limited to the illustrated examples.

The polar functional group is a non-hydrocarbonaceous polar group including at least one of oxygen, nitrogen, phosphorus, sulfur, silicon, and boron, and may be selected from the group consisting of:

—$R^8OR^9$, —$OR^9$, —$OC(O)OR^9$, —$R^8OC(O)OR^9$, —$C(O)R^9$, —$R^8C(O)R^9$, —$OC(O)R^9$, —$R^8C(O)OR^9$, —$C(O)OR^9$, —$R^8OC(O)R^9$, —$(R^8O)_k$—$OR^9$, —$(OR^8)_k$—$OR^9$, —$C(O)$—$O$—$C(O)R^9$, —$R^8C(O)$—$O$—$C(O)R^9$, —$SR^9$, —$R^8SR^9$, —$SSR^8$, —$R^8SSR^9$, —$S(=O)R^9$, —$R^8S(=O)R^9$, —$R^8C(=S)R^9$, —$R^8C(=S)SR^9$, —$R^8SO_3R^9$, —$SO_3R^9$, —$R^8N=C=S$, —$N=C=S$, —$NCO$, $R^8$—$NCO$, —$CN$, —$R^8CN$, —$NNC(=S)R^9$, —$R^8NNC(=S)R^9$, —$NO_2$, —$R^8NO_2$, —$P(R^9)_2$, —$R^8P(R^9)_2$, —$P(=O)(R^9)_2$, —$R^8P(=O)(R^9)_2$,

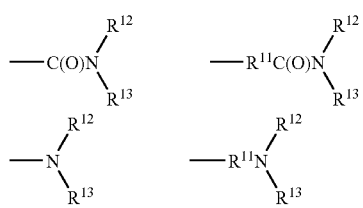

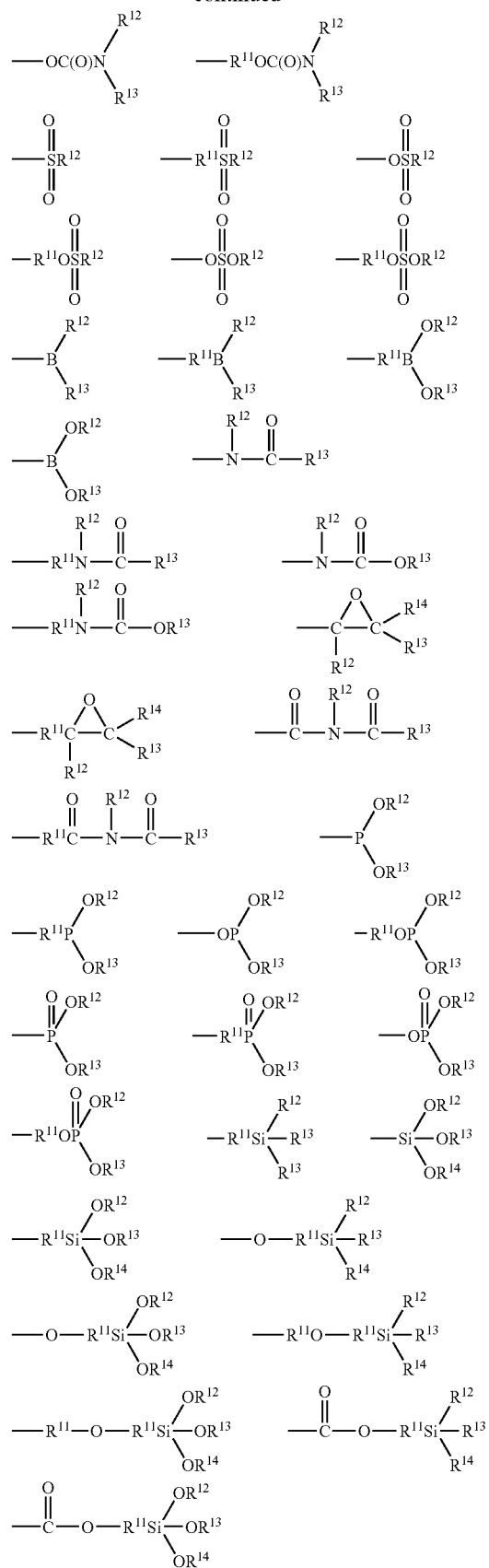

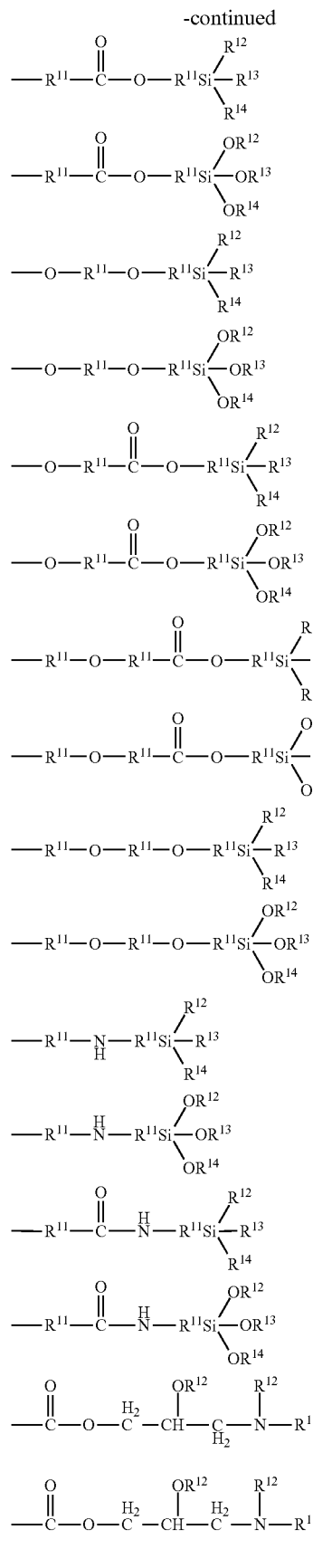
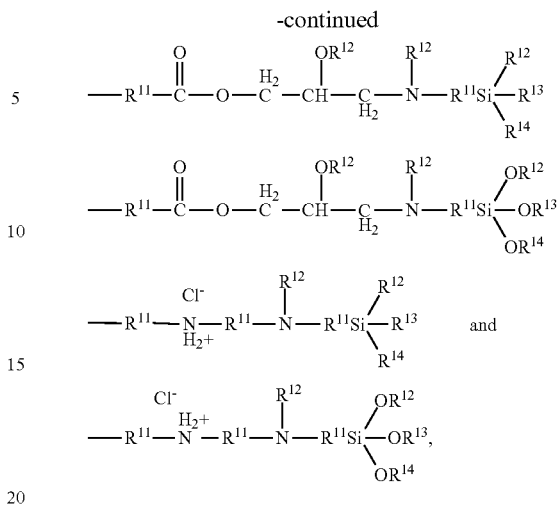

but is not limited to the illustrated examples.

In the polar functional group, $R^8$'s and $R^{11}$'s are each C1-C20 straight or branched alkylene, haloalkylene, alkenylene, or haloalkenylene; C3-C20 straight or branched alkynylene or haloalkynylene; C3-C12 cycloalkylene which is unsubsituted or substituted by alkyl, alkenyl, alkynyl, halogen, haloalkyl, haloalkenyl, or haloalkynyl; C6-C40 arylene which is unsubsituted or substituted by alkyl, alkenyl, alkynyl, halogen, haloalkyl, haloalkenyl, or haloalkynyl; or C7-C15 aralkylene which is unsubsittuted or substituted by alkyl, alkenyl, alkynyl, halogen, haloalkyl, haloalkenyl, or haloalkynyl, $R^9$'s, $R^{12}$'s, $R^{13}$'s, and $R^{14}$'s are each hydrogen; halogen; C1-C20 straight or branched alkyl, haloalkyl, alkenyl, or haloalkenyl; C3-C20 straight or branched alkynyl or haloalkynyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; C7-C15 aralkyl which is unsubstituted or substituted by alkyl, alkenyl, alkynyl, halogen, haloalkyl, haloalkenyl, or haloalkynyl; or alkoxy, haloalkoxy, silyl, siloxy, aryloxy, haloaryloxy, carbonyloxy, or halocarbonyloxy, and k's are each an integer of 1 to 10.

In the metal catalyst complex used in the method of the present invention, $L_3$ is an N-heterocyclic carbene (NHC) ligand and may be one selected from compounds represented by Formulae 3A through 3D below, but is not limited to the illustrated examples, and all NHC compounds known in the pertinent art can also be used:

<Formula 3A>

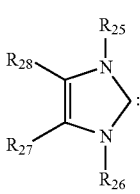

<Formula 3B>

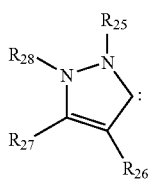

<Formula 3C>

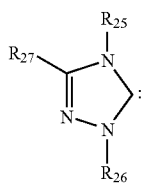

<Formula 3D>

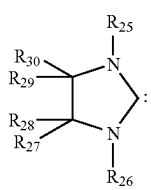

wherein $R_{25}$, $R_{26}$, $R_{27}$, $R_{28}$, $R_{29}$, and $R_{30}$ are each independently hydrogen, C1-C20 straight or branched alkyl, C3-C12 cycloalkyl, C2-C20 straight or branched alkenyl, C6-C15 cycloalkenyl, C3-C20 straight or branched allyl, C6-C30 aryl, C6-C30 heteroatom-containing aryl, or C7-C30 aralkyl, each of which may be substituted by at least one hydrocarbyl and/or heteroatom substituent selected from C1-C5 straight or branched alkyl or haloalkyl, C2-C5 straight or branched alkenyl or haloalkenyl, halogen, sulfur, oxygen, nitrogen, phosphorus, and a phenyl group. Here, the phenyl group may be optionally substituted by C1-C5 straight or branched alkyl or haloalkyl, halogen, or a heteroatom, but is not limited to the illustrated examples, and the alkenyl may include allyl or vinyl.

In the metal catalyst complex used in the method of the present invention, [Ani] is an anion capable of weakly coordinating with the Group X metal M, and may be one selected from the group consisting of borate, aluminate, [SbF$_6$]—, [PF$_6$]—, [AsF$_6$]—, perfluoroacetate [CF$_3$CO$_2$]—, perfluoropropionate [C$_2$F$_5$CO$_2$]—, perfluorobutyrate [CF$_3$CF$_2$CF$_2$CO$_2$]—, perchlorate [ClO$_4$]—, p-toluenesulfonate [p-CH$_3$C$_6$H$_4$SO$_3$]—, [SO$_3$CF$_3$]—, boratabenzene, and carborane which is unsubstituted or substituted by halogen.

In more detail, in the metal catalyst complex used in the method of the present invention, the borate or the aluminate may be an anion represented by Formula 4A or 4B below:

[M'(R$_{30}$)$_4$]  <Formula 4A>

[M'(OR$_{30}$)$_4$]  <Formula 4B> wherein M' is boron or aluminum, and $R_{30}$'s are each independently halogen; C1-C20 straight or branched alkyl or alkenyl which is unsubstituted or substituted by halogen; C3-C12 cycloalkyl which is unsubstituted or substituted by halogen; C6-C40 aryl which is unsubstituted or substituted by halogen or hydrocarbon; C6-C40 aryl which is substituted by C3-C20 straight or branched trialkylsiloxy or C18-C48 straight or branched triarylsiloxy; or C7-C15 aralkyl which is unsubstituted or substituted by halogen or hydrocarbon.

The metal catalyst complex used in the method of the present invention may be represented by Formula 5 below:

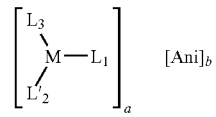

<Formula 5> wherein M, $L_1$, $L'_2$, $L_3$, [Ani], a, and b are as defined above.

More preferably, the metal catalyst complex may be selected from compounds represented by Formulae 6A through 6D below:

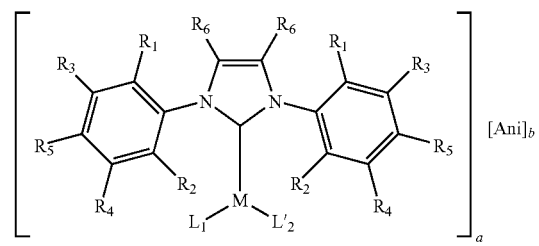

<Formula 6A>

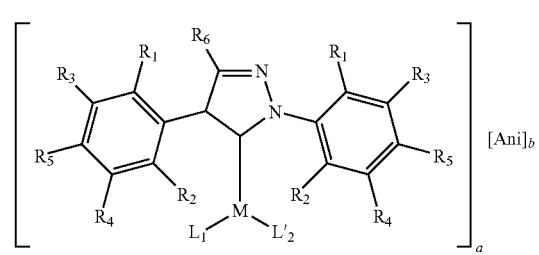

<Formula 6B>

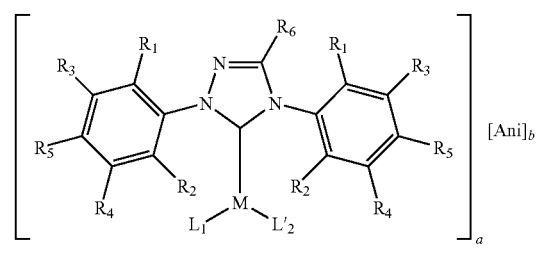

<Formula 6C>

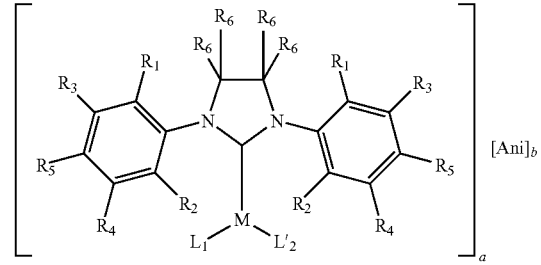

<Formula 6D> wherein M, $L_1$, $L'_2$, [Ani], a, and b are as defined above, and $R_1$ through $R_6$ are each independently hydrogen; halogen; C1-C20 straight or branched alkyl, alkoxy, or alkenyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; C7-C15 aralkyl which is unsubstituted or substituted by alkyl, alkenyl, alkynyl, halogen, haloalkyl, haloalkenyl, or haloalkynyl; or C3-C20 alkynyl, but are not limited to the illustrated examples. The alkenyl may include allyl or vinyl. At least one of $R_1$ to $R_6$ is halogen or halogen-containing alkyl, aryl, aralkyl, or alkylaryl group.

In the compounds of Formulae 6A through 6D above, $R_1$ through $R_6$ may also include a polar functional group including at least one of oxygen, nitrogen, phosphorus, sulfur, silicon, and boron, instead of halogen. The polar functional group is not particularly limited provided that it can provide an electronic effect by inducing electron withdrawal or donation. Preferably, the polar functional group may be a silyl group, a sulfonyl group, a nitro group, an amino group, a cyano group, an acetyl group, an ester group, a carbonyl group, an ether group, or the like.

Still more preferably, the metal catalyst complex may be represented by Formula 7 below:

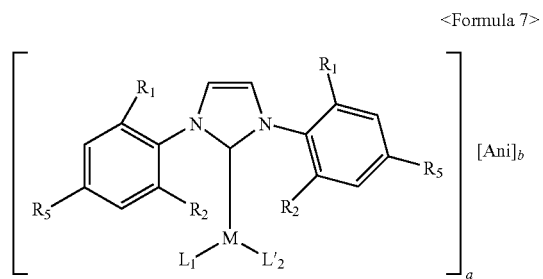

<Formula 7> wherein M, $L_1$, $L'_2$, [Ani], $R_1$, $R_2$, $R_5$, a, and b are as defined above.

Most preferably, the metal catalyst complex may be represented by Formula 8 below:

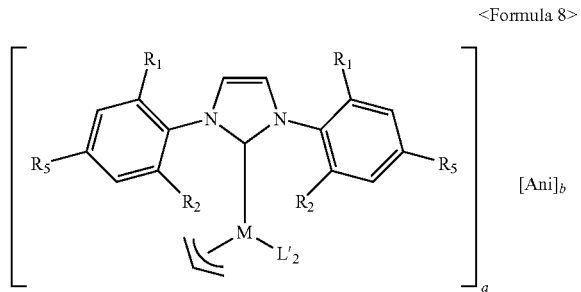

<Formula 8> wherein M, $L'_2$, $R_1$, $R_2$, $R_5$, and [Ani] are as defined above.

And, at least one of $R_1$, $R_2$, and $R_5$ is halogen or halogen-containing alkyl, aryl, aralkyl, or alkylaryl group.

In particular, the metal catalyst complex may be represented by Formula 8A below:

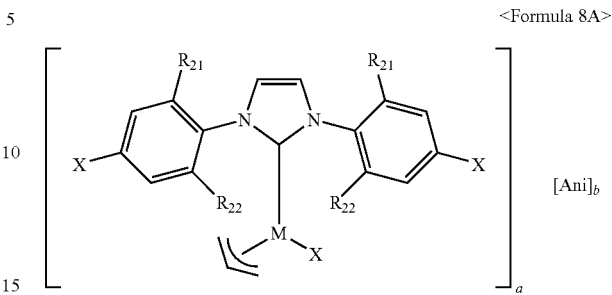

<Formula 8A> wherein a and b are as defined above, $R_{21}$ and $R_{22}$ are each independently C1-C20 straight or branched alkyl,

is C3 allyl, and

X is halogen.

In the method of preparing the cyclic olefin polymer according to the present invention, the metal catalyst complex may be loaded on a microparticle support. The microparticle support may be silica, titania, silica/chromia, silica/chromia/titania, silica/alumina, aluminum phosphate gel, silanized silica, silica hydrogel, montmorillonite clay, or zeolite. The use of the metal catalyst complex loaded on the microparticle support enables to adjust a molecular weight distribution of the polymer according to a specific application of the polymer and to enhance an apparent density of the polymer.

In the method of preparing the cyclic olefin polymer according to the present invention, the metal catalyst complex may be used as a solution obtained by dissolving it in an organic solvent selected from the group consisting of dichloromethane, dichloroethane, toluene, chlorobenzene, and a mixture thereof. The content of the organic solvent may be 10 to 800 parts by weight, more preferably 50 to 400 parts by weight, based on the total weight (100 parts by weight) of monomers in a monomer solution. If the content of the organic solvent is less than 10 parts by weight, stirring may be difficult and unreacted monomers may remain due to too high viscosity, thereby lowering a polymerization yield. Furthermore, it is necessary to dilute a reaction solution using excess solvent to compensate for too high viscosity. On the other hand, if the content of the organic solvent exceeds 800 parts by weight, the reaction rate may be lowered, thereby resulting in a reduction in yield and molecular weight of a product. Alternatively, the metal catalyst complex may also be introduced as a solid phase into a monomer solution.

In the method of preparing the cyclic olefin polymer according to the present invention, the molar ratio of the metal catalyst complex to all monomers in a monomer solution may be 1/50 to 1/100,000, more preferably 1/100 to 1/20,000. If the molar ratio of the metal catalyst complex exceeds 1/100, it may be difficult to remove a catalyst residue on a polymer. On the other hand, if it is less than 1/20,000, a polymerization yield may be lowered.

In the method of preparing the cyclic olefin polymer according to the present invention, the cyclic olefin polymer may be a cyclic olefin homopolymer having a polar functional group; a copolymer of cyclic olefin monomers having different polar functional groups; or a copolymer of a cyclic olefin monomer having a polar functional group and a cyclic olefin monomer having a nonpolar functional group.

A polar functional group-containing norbornene addition polymer prepared using the method of the present invention may include at least 0.1-99.9 mole % of a polar functional group-containing norbornene monomer. At this time, the polar functional group-containing norbornene monomer may be a mixture of an endo isomer and an exo isomer, and the mixture ratio of the endo isomer and the exo isomer is not limited. A detailed description thereof will be provided in the following working examples.

The addition polymerization of the present invention may be performed in the same manner as a conventional method of preparing a norbornene-based polymer including: mixing a norbornene-based monomer and a catalyst in a solvent and performing polymerization of the resultant mixture. According to the method of the present invention, a polar functional group-containing cyclic olefin addition polymer can be obtained in a high yield of 40% or more, and can have a high weight average molecular weight ($M_w$) of 20,000 or more. Therefore, according to the method of the present invention, a polar functional group-containing cyclic olefin addition polymer having a high molecular weight can be prepared in a high yield. If the molecular weight of a cyclic olefin polymer is less than 20,000, mechanical properties may be lowered. On the other hand, if it exceeds 500,000, processability of a polymer may be lowered.

The present invention also provides a cyclic olefin polymer prepared in the method, which is a cyclic olefin addition polymer having a weight average molecular weight ($M_w$) of 20,000 to 500,000 and including a polar functional group.

More specifically, the cyclic olefin addition polymer may be represented by Formula 9 below:

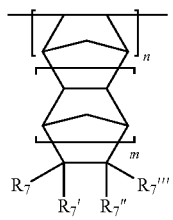

<Formula 9> wherein m, $R_7$, $R_7'$, $R_7''$, and $R_7'''$ are as defined above with respect to Formula 2 above, at least one of $R_7$, $R_7'$, $R_7''$, and $R_7'''$ is a polar functional group, and n is degree of polymerization and is a real number of 100 to 5,000.

The cyclic olefin addition polymer may also be represented by Formula 10 below:

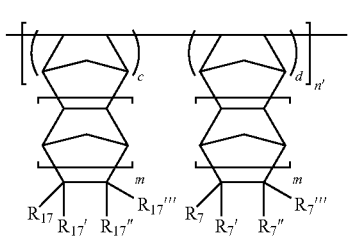

<Formula 10> wherein m, $R_7$, $R_7'$, $R_7''$, and $R_7'''$ are as defined above with respect to Formula 2 above, at least one of $R_7$, $R_7'$, $R_7''$, and $R_7'''$ is a polar functional group, $R_{17}$, $R_{17}'$, $R_{17}''$, and $R_{17}'''$ are nonpolar functional groups, and are each independently selected from the group consisting of hydrogen; halogen; C1-C20 straight or branched alkyl, haloalkyl, alkenyl, or haloalkenyl; C3-C20 straight or branched alkynyl or haloalkynyl; C3-C12 cycloalkyl which is unsubstituted or substituted by alkyl, alkenyl, alkynyl, halogen, haloalkyl, haloalkenyl, or haloalkynyl; C6-C40 aryl which is unsubstituted or substituted by alkyl, alkenyl, alkynyl, halogen, haloalkyl, haloalkenyl, or haloalkynyl; and C7-C15 aralkyl which is unsubstituted or substituted by alkyl, alkenyl, alkynyl, halogen, haloalkyl, haloalkenyl, or haloalkynyl, m's may be different, n' is degree of polymerization and is a real number of 100 to 2,500, and c and d are molar ratios, c+d=1, $0.1 \leq c \leq 0.95$, and $0.05 \leq d \leq 0.9$.

The cyclic olefin addition polymer may also be represented by Formula 11 below:

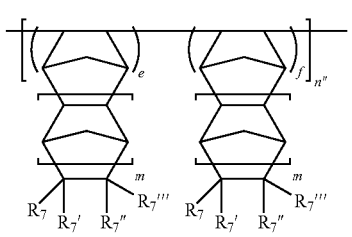

<Formula 11> wherein m, $R_7$, $R_7'$, $R_7''$, and $R_7'''$ are as defined above with respect to Formula 2 above, at least one of $R_7$, $R_7'$, $R_7''$, and $R_7'''$ is a polar functional group, m's may be different, n" is degree of polymerization and is a real number of 100 to 2,500, e and f are molar ratios, e+f=1, $0.1 \leq e \leq 0.9$ and $0.1 \leq f \leq 0.9$, and a repeating unit satisfying the molar ratio e is different from a repeating unit satisfying the molar ratio f.

A polar functional group-containing norbornene-based polymer prepared according the present invention is a cyclic olefin polymer that is transparent and has good adhesion to metals or polymers having different polar functional groups, low dielectric constant suitable for insulating electronic devices, and good thermal stability and strength. Furthermore, the polar functional group-containing norbornene-based polymer has an adhesion to electronic substrates in the absence of a coupling agent and a good adhesion to metal substrates such as copper, silver, or gold. Still furthermore, the polar functional group-containing norbornene-based polymer has good optical characteristics and thus can be used as materials for protection films of polarization plates. In addition, the polar functional group-containing norbornene-based polymer can be used as materials for electronic devices such as integrated circuits, printed circuit boards, or multi-chip modules.

Hereinafter, the present invention will be described more specifically with reference to the following working examples. The following working examples are for illustrative purposes only and are not intended to limit the scope of the invention.

In the following working examples, all manipulations for treating compounds susceptible to air or water were carried out using standard Schlenk technique or glove box technique. NMR spectra were obtained using a Bruker 300 spectrometer. $^1$H NMR spectrum and $^{13}$C NMR spectrum were measured at 300 MHz and 75 MHz, respectively. The molecular weights and molecular weight distributions of polymers were measured by GPC (gel permeation chromatography) using standard polystyrene samples. Thermogravimetric analysis (TGA) was made using TA Instrument (TGA 2050; heating rate: 10 K/min). Toluene was purified by distillation from potassium/benzophenone, and dichloromethane and chlorobenzene were purified by distillation from $CaH_2$.

Synthesis of Monomers

SYNTHESIS EXAMPLE 1

Synthesis of 5-norbornene-2-carboxylic acid methylester (monomer b) (endo: exo=100:0)

5-norbornene-2-carboxylic acid (a mixture of endo- and exo-isomers) (3.8 g, 27.5 mmol) was dissolved in distilled water. A solution of $I_2$ (9.4 g, 37.1 mmol) and KI (19 g, 114 mmol) in 112 ml of distilled water was added to the reaction mixture, and the resultant mixture was incubated at room temperature for three hours. After the reaction was terminated, the resultant solution was extracted with ethylether. A solvent was removed from the organic layer to obtain oily iodolactone. This compound was dissolved in a trace amount of ethylacetate, and the resultant solution was recrystallized with hexane to give pure crystalline iodolactone (yield: 50%).

The iodolactone (4.4 g, 16.6 mmol) was dissolved in 70 ml of glacial acetic acid. The resultant solution was cooled to 0° C. and zinc dust (21.5 g, 328 mmol) was gradually added thereto. The reaction mixture was incubated at 15° C. for three hours and then at room temperature for two hours. An undissolved inorganic matter was filtered out, and the filtrate was diluted with water and extracted with ethylether. The organic layer was collected, dried over anhydrous $MgSO_4$, and purified by fractional distillation to obtain 5-norbornene-2-carboxylic acid (endo-isomer). The endo-isomer and $Na_2CO_3$ were dissolved in acetone, and $CH_3I$ was gradually added thereto. A solvent was removed from the resultant solution followed by silica column chromatography to give a pure endo-isomer (monomer b).

SYNTHESIS EXAMPLE 2

Synthesis of 5-norbornene-2-carboxylic acid methylester (monomer b) (endo:exo=5:95)

5-norbornene-2-carboxylic acid (a mixture of endo- and exo-isomers) (3.8 g, 27.5 mmol) was dissolved in distilled water. A solution of $I_2$(9.4 g, 37.1 mmol) and KI (19 g, 114 mmol) in 112 ml of distilled water was added to the reaction mixture, and the resultant mixture was incubated at room temperature for three hours. After the reaction was terminated, the resultant solution was extracted with ethylether. The aqueous layer was oxidized with 5% $H_2SO_4$, and extracted with ethylether. A solvent was remove from the organic layer, and the residue was purified by fractional distillation to obtain 5-norbornene-2-carboxylic acid (a mixture of endo- and exo-isomers, endo:exo=5:95). This compound and $Na_2CO_3$ were dissolved in acetone, and $CH_3I$ was gradually added thereto. A solvent was removed from the resultant solution followed by silica column chromatography to give an exo-isomer (monomer b).

Preparation of Precatalysts

EXAMPLE 1

Preparation of Compound 1 (ArN=CH—CH=NAr, Ar=2,6-Me$_2$-4-BrC$_6$H$_2$)

4-bromo-2,6-dimethyl aniline (5.6 g, 28 mmol) and glyoxal (40% solution, 1.58 ml (14 mmol)) were dissolved in methanol (30 ml), and formic acid (1 ml) was added thereto. The reaction mixture was stirred for 48 hours. The resultant solution was filtered and dried in vacuum to give a compound 1 as a yellow crystal (4.1 g, yield: 70%).

$^1$H NMR (CDCl$_3$): 8.06 (s, 2 H), 7.24 (s, 4 H), 2.15 (s, 12 H), $^{13}$C NMR(CDCl$_3$): δ 163.98, 149.08, 131.37, 129.07, 118.16, 18.52

HRMS m/z calcd: 419.9386, obsd: 419.9387

EXAMPLE 2

Preparation of Compound 2 (ArN=CH—CH=NAr, Ar=2,6-iPr$_2$-4-IC$_6$H$_2$)

4-iodo-2,6-diisopropyl aniline (8.5 g, 28 mmol) and glyoxal (40% solution, 1.58 ml (14 mmol)) were dissolved in methanol (30 ml), and formic acid (1 ml) was added thereto. The reaction mixture was stirred for 48 hours. The resultant solution was filtered and dried in vacuum to give a compound 2 as a yellow crystal (6.4 g, yield: 73%).

$^1$H NMR (CDCl$_3$): 8.04 (s, 2 H), 7.28 (s, 4 H), 2.85 (m, 4 H), 1.16 (d, 12 H, 6.9 Hz), $^{13}$C NMR(CDCl$_3$): δ 163.53, 149.06, 139.66, 132.91, 90.57, 28.44, 23.58

HRMS m/z calcd: 628.0811, obsd: 628.0812

EXAMPLE 3

Preparation of Compound 3 (ArN=CH—CH=NAr, Ar=2,6-iPr$_2$-4-BrC$_6$H$_2$)

4-bromo-2,6-diisopropyl aniline (7.2 g, 28 mmol) and glyoxal (40% solution, 1.58 ml (14 mmol)) were dissolved in methanol (30 ml), and formic acid (1 ml) was added thereto. The reaction mixture was stirred for 48 hours. The resultant solution was filtered and dried in vacuum to give a compound 3 as a yellow crystal (5.2 g, yield: 70%).

¹H NMR (CDCl₃): 8.07 (s, 2 H), 7.32 (s, 4 H), 2.87 (m, 4 H), 1.18 (d, 12 H, 6.9 Hz),

¹³C NMR(CDCl₃): δ 163.68, 147.26, 139.50, 126.90, 119.24, 90.57, 28.59, 23.63

HRMS m/z calcd 532.1088, obsd: 532.1089

EXAMPLE 4

Preparation of Compound 4 [N,N'-bis(4-bromo-2,6-dimethylphenyl)imidazolium chloride]

The compound 1 (3 g, 7.1 mmol) and para-formaldehyde (0.22 g, 7.1 mmol) were dissolved in toluene (30 ml) and refluxed at 100° C. until para-formaldehyde was completely dissolved. The resultant solution was cooled to 40° C., and 4M HCl in dioxane (1.7 ml, 7.1 mmol) was gradually added thereto. Then, the reaction mixture was cooled to 70° C., refluxed for about one hour, stirred at room temperature for three hours, filtered, and dried in vacuum to give a compound 4 as a gray powder (1.8 g, yield: 54%).

¹H NMR (CDCl₃): 11.65 (s, 1 H), 7.56 (s, 2 H), 7.40 (s, 4H), 2.22 (s, 12H)

¹³C NMR(CDCl₃): δ 137.70, 137.34, 132.57, 131.96, 125.23, 124.71

HRMS m/z calcd: 432.9914, obsd: 432.9911

EXAMPLE 5

Preparation of Compound 5 [N,N'-bis(4-iodo-2,6-diisopropylphenyl)imidazolium chloride]

The compound 2 (4.5 g, 7.1 mmol) and para-formaldehyde (0.22 g, 7.1 mmol) were dissolved in toluene (30 ml) and refluxed at 100° C. until para-formaldehyde was completely dissolved. The resultant solution was cooled to 40° C., and 4M HCl in dioxane (1.7 ml, 7.1 mmol) was gradually added thereto. Then, the reaction mixture was cooled to 70° C., refluxed for about one hour, stirred at room temperature for three hours, filtered, and dried in vacuum to give a compound 5 as a gray powder (2.7 g, yield: 60%).

¹H NMR (C2D6SO): 10.24 (s, 1 H), 8.55 (s, 2 H), 7.81 (s, 4H), 4.25 (m, 4H), 1.24 (d, 12H, 6.9 Hz), 1.14 (d, 12H, 6.9 Hz)

HRMS m/z calcd: 628.0811, obsd: 628.0812

EXAMPLE 6

Preparation of Compound 6 [N,N'-bis(4-bromo-2,6-diisopropylphenyl)imidazolium chloride]

The compound 3 (3.8 g, 7.1 mmol) and para-formaldehyde (0.22 g, 7.1 mmol) were dissolved in toluene (30 ml) and refluxed at 100° C. until para-formaldehyde was completely dissolved. The resultant solution was cooled to 40° C., and 4M HCl in dioxane (1.7 ml, 7.1 mmol) was gradually added thereto. Then, the reaction mixture was cooled to 70° C., refluxed for about one hour, stirred at room temperature for three hours, filtered, and dried in vacuum to give a compound 6 as a gray powder (2.32 g, yield: 60%).

¹H NMR (CDCl₃): 11.24 (s, 1 H), 7.76 (s, 2 H), 7.45 (s, 4H), 2.36 (m, 4H), 1.24 (dd, 12H, 5.7 Hz)

HRMS m/zcalcd: 545.1166, obsd: 545.1167

EXAMPLE 7

Preparation of Compound 7 [chloro(η³-allyl)-(N,N'-bis(4-bromo-2,6-dimethylphenyl)imidazol-2-ylidene)-palladium]

The compound 4 (1.5 g, 3.2 mmol) and potassium tert-butoxide (0.39 g, 3.2 mmol) were dissolved in tetrahydrofuran. The reaction mixture was stirred for four hours and a solvent was removed in vacuum. The residue was dissolved in toluene in a glove box and the resultant solution was filtered through a column packed with cellite. Toluene was removed in a reduced pressure to obtain a carbene compound as a gray solid (0.9 g, 65%). The carbene compound (0.9 g, 2.1 mmol) and allyl palladium chloride dimer [(ally)PdCl]₂ (0.38 g, 1.05 mmol) were dissolved in tetrahydrofuran, and the reaction mixture was stirred for one hour. Then, a solvent was removed in a reduced pressure, the residue was washed with pentane, and the resultant solid product was filtered to give a compound 7 as a gray powder (1.2 g, 92%).

¹H NMR (300 Mz, CDCl₃): δ 7.33 (s, 4 H), 7.11 (s, 2 H), 4.91 (m, 1 H), 3.95 (d, 1 H), 3.21 (d, 1 H), 2.87 (d, 1 H), 2.23 (s, 6 H), 2.21 (s, 6 H), 1.82 (d, 1 H),

¹H NMR (CDCl₃): 7.33 (s, 4H), 7.11 (s, 2 H), 4.91 (sep, 1H, 9 Hz), 3.95 (dd, 1H, 1.5 Hz), 3.21 (d, 1H, 6 Hz), 2.87 (d, 1H, 13.5 Hz), 2.22 (d, 12H, 10.2 Hz), 1.82 (d, 1H, 11.7 Hz)

¹³C NMR(CDCl₃): δ 138.32, 137.60, 132.42, 131.70, 123.45, 123.37, 115.07, 77.62, 73.52, 49.97, 18.67

HRMS m/z calcd : 578.9262, obsd : 578.9263

EXAMPLE 8

Preparation of Compound 8 [chloro(η³-allyl)-(N,N'-bis(4-iodo-2,6-diisopropylphenyl)imidazol-2-ylidene)-palladium]

The compound 5 (2.0 g, 3.2 mmol) and potassium tert-butoxide (0.39 g, 3.2 mmol) were dissolved in tetrahydrofuran. The reaction mixture was stirred for four hours and a solvent was removed in vacuum. The residue was dissolved in toluene in a glove box and the resultant solution was filtered through a column packed with cellite. Toluene was removed in a reduced pressure to obtain a carbene compound as a gray solid (1.24 g, 65%). The carbene compound (1.24 g, 2.1 mmol) and allyl palladium chloride dimer [(ally)PdCl]₂ (0.38 g, 1.05 mmol) were dissolved in tetrahydrofuran, and the reaction mixture was stirred for one hour. Then, a solvent was removed in a reduced pressure, the residue was washed with pentane, and the resultant solid product was filtered to give a compound 8 as a gray powder (1.49 g, 90%).

¹H NMR (CDCl₃): 7.50 (s, 4 H), 7.01 (s, 2 H), 4.78 (m, 1 H, 7.2 Hz), 3.89 (dd, 1 H, 1.5 Hz), 2.97 (dd, 1H, 6 Hz), 2.95 (dd, 2H, 6.9 Hz), 2.68 (dd, 2H, 6.6 Hz), 1.57 (d, 1H, 12.3 Hz), 1.28 (d, 6H, 6.6 Hz), 1.22 (d, 6H, 6.6 Hz), 1.08 (d, 6H, 6.6 Hz), 0.98 (d, 6H, 6.6 Hz)

¹³C NMR(CDCl₃): δ 145.53, 132.54, 130.30, 127.61, 127.43, 126.29, 125.13, 68.29, 29.48, 25.96, 24.99, 24.27, 13.54, 12.74

HRMS m/z calcd: 787.0237, obsd: 787.0238

EXAMPLE 9

Preparation of Compound 9 [chloro(η³-allyl)-(N,N'-bis(4-bromo-2,6-diisopropylphenyl)imidazol-2-ylidene)-palladium]

The compound 6 (1.74 g, 3.2 mmol) and potassium tert-butoxide (0.39 g, 3.2 mmol) were dissolved in tetrahydrofuran. The reaction mixture was stirred for four hours and a solvent was removed in vacuum. The residue was dissolved in toluene in a glove box and the resultant solution was filtered through a column packed with cellite. Toluene was removed in a reduced pressure to obtain a carbene compound as a gray solid (1.02 g, 63%). The carbene compound (1.02 g, 2.0 mmol) and allyl palladium chloride dimer [(ally)PdCl]$_2$ (0.36 g, 1.0 mmol) were dissolved in tetrahydrofuran, and the reaction mixture was stirred for one hour. Then, a solvent was removed in a reduced pressure, the residue was washed with pentane, and the resultant solid product was filtered to give a compound 9 as a gray powder (1.24 g, 90%).

$^1$H NMR (CDCl$_3$): 7.37 (s, 4 H), 7.13 (s, 2 H), 4.84 (m, 1 H, 5.7 Hz), 3.95 (dd, 1 H, 1.5 Hz), 3.08 (m, 3H), 2.84 (d, 1H, 13.5 Hz), 2.78 (dd, 2H, 6.9 Hz), 1.62 (s, 1H), 1.36 (d, 6H, 6.6 Hz), 1.30 (d, 6H, 6.6 Hz), 1.16 (d, 6H, 6.6 Hz), 1.06 (d, 6H, 6.6 Hz)

$^{13}$C NMR(CDCl$_3$): δ 145.5, 132.5, 130.3, 127.6, 127.4, 126.2, 125.1, 68.2, 29.4, 25.9, 24.9, 24.2, 13.5, 12.7

HRMS m/z calcd: 691.0514, obsd: 691.0516

The compounds 1-9 prepared in Examples 1-9 are as represented by Reaction Scheme 1 below:

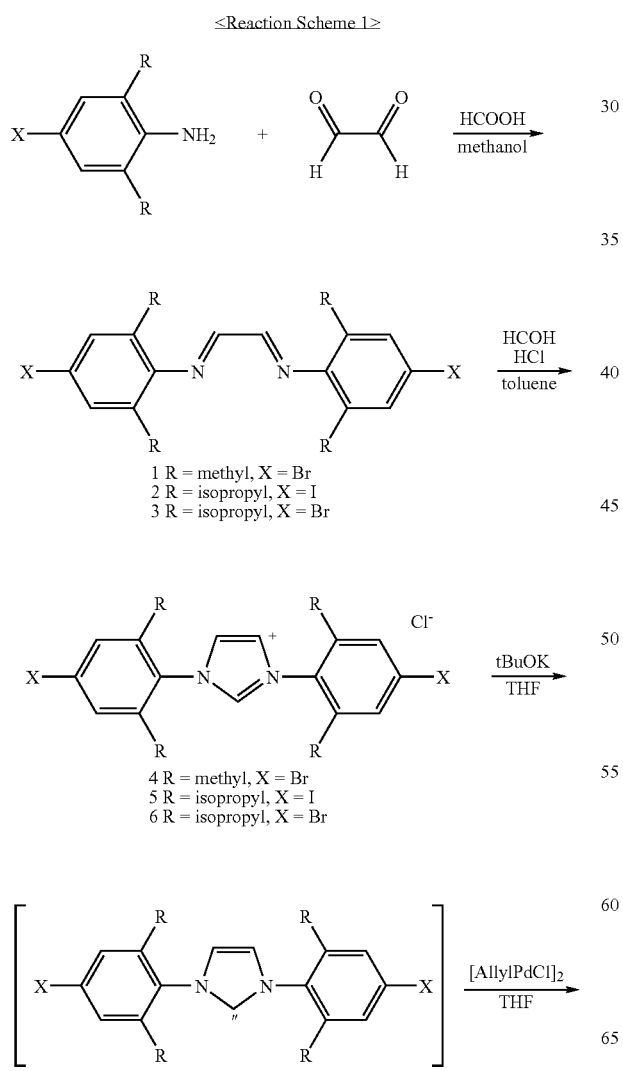

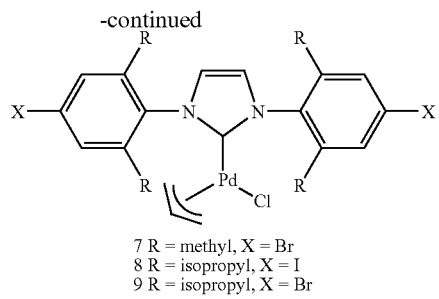

7 R = methyl, X = Br
8 R = isopropyl, X = I
9 R = isopropyl, X = Br

Preparation of Metal Catalyst Complexes (Catalysts)

EXAMPLE 10

Preparation of Compound 10

The compound 9 (0.2 g, 0.351 mmol) and AgBF$_4$ (68 mg, 0.351 mmol) were dissolved in 5 ml of CH$_2$Cl$_2$ and the reaction mixture was stirred for one hour. The reaction solution was filtered through cellite and a solvent was removed to give a compound 10 as a gray powder (0.2 g, 92%).

$^1$H NMR (CDCl$_3$): 7.43 (s, 4 H), 7.24 (s, 2 H), 4.84 (m, 1 H), 4.45 (br, 1 H), 3.34 (br, 1H), 2.64 (br, 4H), 2.32 (m, 1H), 2.21 (m, 1H), 1.30 (m, 12H), 1.19 (m, 12H)

The X-ray crystallographic structure of the compound 10 is illustrated in FIG. 1.

Preparation of Homopolymers and Copolymers

Monomers and precatalysts used in polymerization reactions below are as follows.

Monomers

a

b

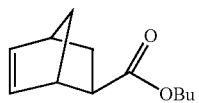

c

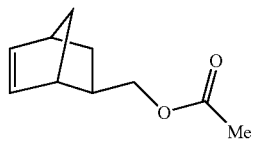

d

Precatalysts
-continued

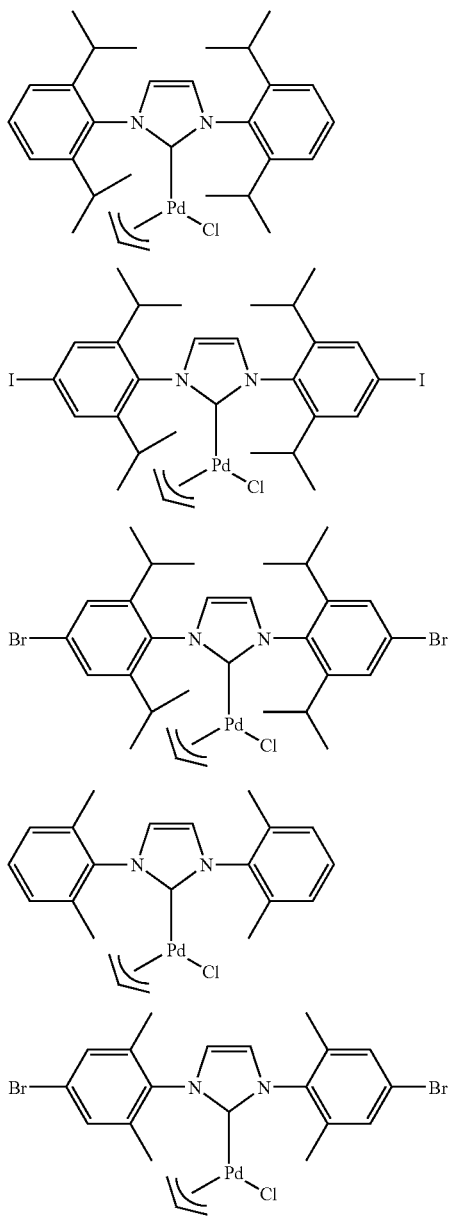

A

B

C

D

E

EXAMPLE 11

Homopolymerization of Norbornene (Monomer a)

Norbornene (5 g, 53.1 mmol) was put into a 100 ml Schlenk flask containing toluene (15 ml). The precatalyst B and silver tetrafluoroborate ($AgBF_4$) were dissolved in 5 ml of a mixed solution of methylene chloride and toluene (1:1) in a glove box, and the reaction mixture was stirred for one hour. Then, the palladium catalyst (0.53 mmol) filtered through a column packed with cellite was put into the flask, and the flask was stirred at 25° C. for 20 hours. Then, the resultant solution was added to excess methanol to obtain a white polymer precipitate. The precipitate was filtered through a glass funnel, and the recovered product was dried in a vacuum oven at 80° C. for 24 hours to give a norbornene polymer (yield: 99%).

EXAMPLE 12

A norbornene polymer was prepared in the same manner as in Example 11 using the same catalyst amount, polymerization solvent, and polymerization time as in Example 11 and the precatalyst C as summarized in Table 1 below.

EXAMPLE 13

A norbornene polymer was prepared in the same manner as in Example 11 using the same catalyst amount, polymerization solvent, and polymerization time as in Example 11 and the precatalyst E as summarized in Table 1 below.

COMPARATIVE EXAMPLE 1

A norbornene polymer was prepared in the same manner as in Example 11 using the same catalyst amount, polymerization solvent, and polymerization time as in Example 11 and the precatalyst A as summarized in Table 1 below.

COMPARATIVE EXAMPLE 2

A norbornene polymer was prepared in the same manner as in Example 11 using the same catalyst amount, polymerization solvent, and polymerization time as in Example 11 and the precatalyst D as summarized in Table 1 below.

TABLE 1

|  | Monomer | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 11 | a | B | 100/1 | $BF_4^-$ | 20 | Toluene | | | Not measured[1] | 99 |
| Example 12 | a | C | 100/1 | $BF_4^-$ | 20 | Toluene | | | Not measured[1] | 99 |
| Example 13 | a | E | 100/1 | $BF_4^-$ | 20 | Toluene | | | Not measured[1] | 99 |
| Comparative Example 1 | a | A | 100/1 | $BF_4^-$ | 20 | Toluene | | | Not measured[1] | 99 |
| Comparative Example 2 | a | D | 100/1 | $BF_4^-$ | 20 | Toluene | | | Not measured[1] | 30 |

[1] not dissolved in tetrahydrofuran
[2] measured by GPC using standard polystyrene
[3] yield after completely separated

EXAMPLE 14

Polymerization of 5-norbornene-2-carboxylic acid methylester (exo:endo=95:5. monomer b)

5-norbornene-2-carboxylic acid methylester (exo:endo=95:5, 5ml (33.0 mmol)) was put into a 100 ml Schienk flask containing 15 ml of toluene. The precatalyst B and silver tetrafluoroborate (AgBF$_4$) were dissolved in 5 ml of a mixed solution of methylene chloride and toluene (1:1) in a glove box, and the reaction mixture was stirred for one hour. Then, the palladium catalyst (0.33 mmol) filtered through a column packed with cellite was put into the flask, and the flask was stirred at 25° C. for 20 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 71%).

EXAMPLE 15

A 5-norbornene-2-carboxylic acid methylester polymer was prepared in the same manner as in Example 14 using the same catalyst amount, polymerization solvent, and polymerization time as in Example 14 and the precatalyst C as summarized in Table 2 below.

COMPARATIVE EXAMPLE 3

A 5-norbornene-2-carboxylic acid methylester polymer was prepared in the same manner as in Example 14 using the same catalyst amount, polymerization solvent, and polymerization time as in Example 14 and the precatalyst A as summarized in Table 2 below.

EXAMPLE 16

Polymerization of 5-norbornene-2-carboxylic acid methylester (exo:endo=50:50, monomer b)

5-norbornene-2-carboxylic acid methylester (exo:endo=50:50, 5ml (33.0 mmol)) was put into a 100 ml Schlenk flask containing 15 ml of toluene. The precatalyst C and silver tetrafluoroborate (AgBF$_4$) were dissolved in 5 ml of a mixed solution of methylene chloride and toluene (1:1) in a glove box, and the reaction mixture was stirred for one hour. Then, the palladium catalyst (0.33 mmol) filtered through a column packed with cellite was put into the flask, and the flask was stirred at 25° C. for 20 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 55%).

EXAMPLE 17

Polymerization of 5-norbornene-2-carboxylic acid methylester (exo:endo=50:50, monomer b)

5-norbornene-2-carboxylic acid methylester (exo:endo=50:50, 5ml (33.0 mmol)) was put into a 100 ml Schlenk flask containing 15 ml of chlorobenzene. The precatalyst B and silver hexafluoroantimonate (AgSbF$_6$) were dissolved in 5 ml of chlorobenzene in a glove box, and the reaction mixture was stirred for one hour. Then, the palladium catalyst (0.33 mmol) filtered through a column packed with cellite was put into the flask, and the flask was stirred at 25° C. for 6 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 92%).

EXAMPLE 18

A 5-norbornene-2-carboxylic acid methylester polymer was prepared in the same manner as in Example 17 using the same catalyst amount, polymerization solvent, and polymerization time as in Example 17 and the precatalyst C as summarized in Table 3 below.

COMPARATIVE EXAMPLE 4

A 5-norbornene-2-carboxylic acid methylester polymer was prepared in the same manner as in Example 17 using the same catalyst amount, polymerization solvent, and polymerization time as in Example 17 and the precatalyst A as summarized in Table 3 below.

TABLE 2

| | Monomer[1] | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 14 | b(95:5) | B | 100/1 | BF$_4^-$ | 20 | Toluene | 9,253 | 20,211 | 2.18 | 71 |
| Example 15 | b(95:5) | C | 100/1 | BF$_4^-$ | 20 | Toluene | 6,928 | 22,021 | 2.89 | 75 |
| Comparative Example 3 | b(95:5) | A | 100/1 | BF$_4^-$ | 20 | Toluene | 10,922 | 20,424 | 1.87 | 70 |

[1] numbers in parentheses represent a ratio of endo- and exo-isomers
[2] measured by GPC using standard polystyrene
[3] yield after completely separated

TABLE 3

| | Monomer[1] | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 16 | b(50:50) | C | 100/1 | $BF_4^-$ | 20 | Toluene | 2,500 | 5,600 | 2.22 | 55 |
| Example 17 | b(50:50) | B | 100/1 | $SbF_6^-$ | 6 | Chlorobenzene | 40,929 | 57,311 | 1.40 | 92 |
| Example 18 | b(50:50) | C | 100/1 | $SbF_6^-$ | 6 | Chlorobenzene | 77,702 | 104,482 | 1.34 | 95 |
| Comparative Example 4 | b(50:50) | A | 100/1 | $SbF_6^-$ | 6 | Chlorobenzene | 25,901 | 34,438 | 1.32 | 93 |

[1]numbers in parentheses represent a ratio of endo- and exo-isomers
[2]measured by GPC using standard polystyrene
[3]yield after completely separated

EXAMPLE 19

Polymerization of 5-norbornene-2-carboxylic acid methylester (exo:endo=20:80, monomer b)

5-norbornene-2-carboxylic acid methylester (exo:endo=20:80, 5ml (33.0 mmol)) was put into a 100 ml Schlenk flask containing 15 ml of chlorobenzene. The precatalyst B and silver hexafluoroantimonate ($AgSbF_6$) were dissolved in 5 ml of chlorobenzene in a glove box, and the reaction mixture was stirred for one hour. Then, the palladium catalyst (0.33 mmol) filtered through a column packed with cellite was put into the flask, and the flask was stirred at 25° C. for 12 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 48%).

EXAMPLE 20

A 5-norbornene-2-carboxylic acid methylester polymer was prepared in the same manner as in Example 19 using the same catalyst amount, polymerization solvent, and polymerization time as in Example 19 and the precatalyst C as summarized in Table 4 below.

COMPARATIVE EXAMPLE 5

A 5-norbornene-2-carboxylic acid methylester polymer was prepared in the same manner as in Example 19 using the same catalyst amount, polymerization solvent, and polymerization time as in Example 19 and the precatalyst A as summarized in Table 4 below.

EXAMPLE 21

Polymerization of 5-norbornene-2-carboxylic acid butylester (exo:endo=95:5, monomer c)

5-norbornene-2-carboxylic acid butylester (exo:endo=95:5, 5 ml (34.4 mmol)) was put into a 100 ml Schlenk flask containing 15 ml of a mixed solution of toluene and methylene chloride ($CH_2Cl_2$) (1:1). The precatalyst B and silver tetrafluoroborate ($AgBF_4$) were dissolved in 5 ml of a mixed solution of methylene chloride and toluene (1:1) in a glove box, and the reaction mixture was stirred for one hour. Then, the palladium catalyst (0.17 mmol) filtered through a column packed with cellite was put into the flask, and the flask was stirred at 25° C. for 12 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 74%).

EXAMPLE 22

A 5-norbornene-2-carboxylic acid butylester polymer was prepared in the same manner as in Example 21 using the same catalyst amount, polymerization solvent, and polymerization time as in Example 21 and the precatalyst C as summarized in Table 5 below.

COMPARATIVE EXAMPLE 6

A 5-norbornene-2-carboxylic acid butylester polymer was prepared in the same manner as in Example 21 using the same catalyst amount, polymerization solvent, and polymerization time as in Example 21 and the precatalyst A as summarized in Table 5 below.

TABLE 4

| | Monomer[1] | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 19 | b(20:80) | B | 100/1 | $SbF_6^-$ | 12 | Chlorobenzene | 7,524 | 11,049 | 1.46 | 48 |
| Example 20 | b(20:80) | C | 100/1 | $SbF_6^-$ | 12 | Chlorobenzene | 11,257 | 15,857 | 1.40 | 52 |
| Comparative Example 5 | b(20:80) | A | 100/1 | $SbF_6^-$ | 12 | Chlorobenzene | 6,242 | 8,543 | 1.36 | 75 |

[1]numbers in parentheses represent a ratio of endo- and exo-isomers
[2]measured by GPC using standard polystyrene
[3]yield after completely separated

COMPARATIVE EXAMPLE 7

Polymerization of 5-norbornene-2-carboxylic acid butylester (exo:endo=95:5, monomer c)

5-norbornene-2-carboxylic acid butylester (exo:endo=95:5, 5 ml (34.4 mmol)) was put into a 100 ml Schlenk flask containing 15 ml of chlorobenzene. The precatalyst A and silver tetrafluoroborate ($AgBF_4$) were dissolved in 5 ml of chlorobenzene in a glove box, and the reaction mixture was stirred for one hour. Then, the palladium catalyst (0.34 mmol) filtered through a column packed with cellite was put into the flask, and the flask was stirred at 25° C. for 20 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 76%).

EXAMPLE 23

Polymerization of 5-norbornene-2-carboxylic acid butylester (exo:endo=95:5, monomer c)

5-norbornene-2-carboxylic acid butylester (exo:endo=95:5, 5 ml (34.4 mmol)) was put into a 100 ml Schlenk flask containing 15 ml of a mixed solution of toluene and methylene chloride (1:1). The precatalyst C and silver hexafluoroantimonate ($AgSbF_6$) were dissolved in 5 ml of a mixed solution of methylene chloride and toluene (1:1) in a glove box, and the reaction mixture was stirred for one hour. Then, the palladium catalyst (0.17 mmol) filtered through a column packed with cellite was put into the flask, and the flask was stirred at 25° C. for 12 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 95%).

EXAMPLE 24

A 5-norbornene-2-carboxylic acid butylester polymer was prepared in the same manner as in Example 23 using the same anion, polymerization solvent, and polymerization time as in Example 23 except that the ratio of the monomer to the precatalyst was 1000/1, as summarized in Table 6 below.

EXAMPLE 25

A 5-norbornene-2-carboxylic acid butylester polymer was prepared in the same manner as in Example 23 using the same anion, polymerization solvent, and polymerization time as in Example 23 except that the ratio of the monomer to the precatalyst was 5000/1, as summarized in Table 6 below.

TABLE 5

| | Monomer[1] | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 21 | c(95:5) | B | 200/1 | $BF_4^-$ | 12 | Toluene/$CH_2Cl_2$ | 40,322 | 49,345 | 1.22 | 74 |
| Example 22 | c(95:5) | C | 200/1 | $BF_4^-$ | 12 | Toluene/$CH_2Cl_2$ | 70,417 | 94,148 | 1.33 | 82 |
| Comparative Example 6 | c(95:5) | A | 200/1 | $BF_4^-$ | 12 | Toluene/$CH_2Cl_2$ | 65,026 | 83,835 | 1.20 | 73 |
| Comparative Example 7 | c(95:5) | A | 100/1 | $BF_4^-$ | 20 | Chlorobenzene | 9,313 | 15,544 | 1.66 | 76 |

[1]numbers in parentheses represent a ratio of endo- and exo-isomers
[2]measured by GPC using standard polystyrene
[3]yield after completely separated

COMPARATIVE EXAMPLE 8

A 5-norbornene-2-carboxylic acid butylester polymer was prepared in the same manner as in Example 23 using the same anion, polymerization solvent, and polymerization time as in Example 23 except that the precatalyst A was used and the ratio of the monomer to the precatalyst was 1000/1, as summarized in Table 6 below.

COMPARATIVE EXAMPLE 9

A 5-norbornene-2-carboxylic acid butylester polymer was prepared in the same manner as in Example 23 using the same anion, polymerization solvent, and polymerization time as in Example 23 except that the precatalyst A was used and the ratio of the monomer to the precatalyst was 5000/1, as summarized in Table 6 below.

TABLE 6

| | Monomer[1] | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 23 | c(95:5) | C | 200/1 | $SbF_6^-$ | 12 | Toluene/$CH_2Cl_2$ | 51,980 | 69,306 | 1.33 | 95 |
| Example 24 | c(95:5) | C | 1000/1 | $SbF_6^-$ | 12 | Toluene/$CH_2Cl_2$ | 93,570 | 118,215 | 1.26 | 45 |
| Example 25 | c(95:5) | C | 5000/1 | $SbF_6^-$ | 12 | Toluene/$CH_2Cl_2$ | 103,579 | 143,974 | 1.39 | 42 |
| Comparative Example 8 | c(95:5) | A | 1000/1 | $SbF_6^-$ | 12 | Toluene/$CH_2Cl_2$ | 53,429 | 74,804 | 1.40 | 40 |
| Comparative Example 9 | c(95:5) | A | 5000/1 | $SbF_6^-$ | 12 | Toluene/$CH_2Cl_2$ | 61,382 | 89,004 | 1.45 | 39 |

[1]numbers in parentheses represent a ratio of endo- and exo-isomers
[2]measured by GPC using standard polystyrene
[3]yield after completely separated

EXAMPLE 26

Polymerization of 5-norbornene-2-methylacetate (exo:endo=40:60, monomer d)

5-norbornene-2-methylacetate (exo:endo=40:60, 5ml (30.9 mmol)) was put into a 100 ml Schlenk flask containing 15 ml of toluene. The precatalyst B and silver tetrafluoroborate (AgBF$_4$) were dissolved in 5 ml of a mixed solution of methylene chloride and toluene in a glove box, and the reaction mixture was stirred for one hour. Then, the palladium catalyst (0.031 mmol) filtered through a column packed with cellite was put into the flask, and the flask was stirred at 25° C. for 20 hours. Then, the resultant solution was added to excess methanol to obtain a white polymer precipitate. The precipitate was filtered through a glass funnel, and the recovered product was dried in a vacuum oven at 80° C. for 24 hours to give a polymer (yield: 62%).

EXAMPLE 27

A 5-norbornene-2-methylacetate polymer was prepared in the same manner as in Example 26 using the same catalyst amount, anion, polymerization solvent, and polymerization time as in Example 26 and the precatalyst C as summarized in Table 7 below.

COMPARATIVE EXAMPLE 10

A 5-norbornene-2-methylacetate polymer was prepared in the same manner as in Example 26 using the same catalyst amount, anion, polymerization solvent, and polymerization time as in Example 26 and the precatalyst A as summarized in Table 7 below.

EXAMPLE 28

Copolymerization of norbornene (monomer a) and 5-norbornene-2-carboxylic acid methylester (monober b) (3:1)

Norbornene (3 g, 31.9 mmol), 5-norbornene-2-carboxylic acid methylester (1.6 ml, 10.6 mmol), and toluene (14 ml) were put into a 100 ml Schlenk flask. The precatalyst B and silver tetrafluoroborate (AgBF$_4$) were dissolved in 5 ml of a mixed solution of methylene chloride and toluene (1:1) in a glove box, and the reaction mixture was stirred for one hour. Then, the palladium catalyst (0.42 mmol) filtered through a column packed with cellite was put into the flask, and the flask was stirred at 25° C. for 20 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 70%).

EXAMPLE 29

A copolymer of norbornene and 5-norbornene-2-carboxylic acid methylester was prepared in the same manner as in Example 28 using the same catalyst amount, polymerization time, anion, and polymerization solvent as in Example 28 and the precatalyst C as summarized in Table 8 below.

COMPARATIVE EXAMPLE 11

A copolymer of norbornene and 5-norbornene-2-carboxylic acid methylester was prepared in the same manner as in Example 28 using the same catalyst amount, polymerization time, anion, and polymerization solvent as in Example 28 and the precatalyst A as summarized in Table 8 below.

EXAMPLE 30

Copolymerization of norbornene (monomer a) and 5-norbornene-2-carboxylic acid methylester (monober b) (3:1)

Norbornene (3 g, 31.9 mmol), 5-norbornene-2-carboxylic acid methylester (1.6 ml, 10.6 mmol), and toluene (14 ml) were put into a 100 ml Schlenk flask. The precatalyst C and silver hexafluoroantimonate (AgSbF$_6$) were dissolved in chlorobenzene in a glove box, and the reaction mixture was stirred for one hour. Then, the palladium catalyst (0.42 mmol) filtered through a column packed with cellite was put into the flask, and the flask was stirred at 25° C. for 12 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 98%).

TABLE 7

| | Monomer[1] | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Example 26 | d(40:60) | B | 1000/1 | BF$_4^-$ | 20 | Toluene | 52,370 | 103,692 | 1.98 | 62 |
| Example 27 | d(40:60) | C | 1000/1 | BF$_4^-$ | 20 | Toluene | 47,940 | 89,648 | 1.87 | 57 |
| Comparative Example 10 | d(40:60) | A | 1000/1 | BF$_4^-$ | 20 | Toluene | 40,554 | 77,864 | 1.92 | 55 |

[1] numbers in parentheses represent a ratio of endo- and exo-isomers
[2] measured by GPC using standard polystyrene
[3] yield after completely separated

TABLE 8

| | Monomer[1] | Precatalyst | [Ani] | Time (h) | Solvent | Mn | Mw | Mw/Mn[3] | Monomer ratio[4] | Yield (%)[5] |
|---|---|---|---|---|---|---|---|---|---|---|
| Example 28 | a + b (3:1) | B | $BF_4^-$ | 20 | Toluene/$CH_2Cl_2$ | Not measured[2] | | | | 70 |
| Example 29 | a + b (3:1) | C | $BF_4^-$ | 20 | Toluene/$CH_2Cl_2$ | Not measured[2] | | | | 75 |
| Example 30 | a + b (3:1) | C | $SbF_6^-$ | 12 | Chlorobenzene | Not measured[2] | | | | 98 |
| Comparative Example 11 | a + b (3:1) | A | $BF_4^-$ | 20 | Toluene/$CH_2Cl_2$ | Not measured[2] | | | | 71 |

[1]numbers in parentheses represent a molar ratio of monomer a and monomer b (a ratio of endo:exo in monomer b is 5:95)
[2]not dissolved in tetrahydrofuran
[3]measured by GPC using standard polystyrene
[4]measured using NMR
[5]yield after completely separated

EXAMPLE 31

Copolymerization of norbornene (monomber a) and 5-norbornene-2-carboxylic acid butylester (monomer c) (3:1)

Norbornene (3 g, 31.9 mmol), 5-norbornene-2-carboxylic acid butylester (1.54 ml, 10.6 mmol), and toluene (14 ml) were put into a 100 ml Schlenk flask. The precatalyst B and silver tetrafluoroborate ($AgBF_4$) were dissolved in 5 ml of a mixed solution of methylene chloride and toluene (1:1) in a glove box, and the reaction mixture was stirred for one hour. Then, the palladium catalyst (0.42 mmol) filtered through a column packed with cellite was put into the flask, and the flask was stirred at 25° C. for 20 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 72%).

EXAMPLE 32

A copolymer of norbornene and 5-norbornene-2-carboxylic acid butylester was prepared in the same manner as in Example 31 using the same catalyst amount, polymerization time, anion, and polymerization solvent as in Example 31 and the precatalyst C as summarized in Table 9 below.

COMPARATIVE EXAMPLE 12

A copolymer of norbornene and 5-norbornene-2-carboxylic acid butylester was prepared in the same manner as in Example 31 using the same catalyst amount, polymerization time, anion, and polymerization solvent as in Example 31 and the precatalyst A as summarized in Table 9 below.

EXAMPLE 33

Copolymerization of norbornene (monomber a) and 5-norbornene-2-carboxylic acid butylester (monomer c) (3:1)

Norbornene (3 g, 31.9 mmol), 5-norbornene-2-carboxylic acid butylester (1.54 ml, 10.6 mmol), and toluene (14 ml) were put into a 100 ml Schlenk flask. The precatalyst C and silver hexafluoroantimonate ($AgSbF_6$) were dissolved in 5 ml of chlorobenzene in a glove box, and the reaction mixture was stirred for one hour. Then, the palladium catalyst (0.42 mmol) filtered through a column packed with cellite was put into the flask, and the flask was stirred at 25° C. for 12 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 87%).

TABLE 9

| | Monomer[1] | Precatalyst | [Ani] | Time (h) | Solvent | Mn | Mw | Mw/Mn[3] | Monomer ratio[4] | Yield (%)[5] |
|---|---|---|---|---|---|---|---|---|---|---|
| Example 31 | a + c (3:1) | B | $BF_4^-$ | 20 | Toluene/$CH_2Cl_2$ | 25,023 | 41,180 | 1.64 | 84:16 (a:c) | 72 |
| Example 32 | a + c (3:1) | C | $BF_4^-$ | 20 | Toluene/$CH_2Cl_2$ | 11,763 | 24,198 | 2.05 | 83:17 (a:c) | 76 |
| Comparative Example 12 | a + c (3:1) | A | $BF_4^-$ | 20 | Toluene/$CH_2Cl_2$ | 17,642 | 40,451 | 2.29 | 81:19 (a:c) | 72 |
| Example 33 | a + c (3:1) | C | $SbF_6^-$ | 12 | Chlorobenzene | Not measured[2] | | | 79:21 (a:c) | 87 |

[1]numbers in parentheses represent a molar ratio of monomer a and monomer c (a ratio of endo:exo in monomer c is 5:95)
[2]not dissolved in tetrahydrofuran
[3]measured by GPC using standard polystyrene
[4]measured using NMR
[5]yield after completely separated

EXAMPLE 34

Copolymerization of norbornene (monomber a) and 5-norbornene-2-carboxylic acid methylester (monomer b) (5:1)

Norbornene (4 g, 42.5 mmol), 5-norbornene-2-carboxylic acid methylester (1.3 ml, 8.5 mmol), and toluene (14 ml) were put into a 100 ml Schienk flask. The precatalyst B and silver tetrafluoroborate (AgBF$_4$) were dissolved in 5 ml of a mixed solution of methylene chloride and toluene (1:1) in a glove box, and the reaction mixture was stirred for one hour. Then, the palladium catalyst (0.42 mmol) filtered through a column packed with cellite was put into the flask, and the flask was stirred at 25° C. for 20 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 82%).

EXAMPLE 35

A copolymer of norbornene and 5-norbornene-2-carboxylic acid methylester (5:1) was prepared in the same manner as in Example 34 using the same catalyst amount, polymerization time, anion, and polymerization solvent as in Example 34 and the precatalyst C as summarized in Table 10 below.

COMPARATIVE EXAMPLE 13

A copolymer of norbornene and 5-norbornene-2-carboxylic acid methylester (5:1) was prepared in the same manner as in Example 34 using the same catalyst amount, polymerization time, anion, and polymerization solvent as in Example 34 and the precatalyst A as summarized in Table 10 below.

EXAMPLE 36

Copolymerization of norbornene (monomber a) and 5-norbornene-2-carboxylic acid methylester (monomer b) (5:1)

Norbornene (4 g, 42.5 mmol), 5-norbornene-2-carboxylic acid methylester (1.3 ml, 8.5 mmol), and toluene (14 ml) were put into a 100 ml Schlenk flask. The precatalyst C and silver hexafluoroantimonate (AgSbF$_6$) were dissolved in 5 ml of chlorobenzene in a glove box, and the reaction mixture was stirred for one hour. Then, the palladium catalyst (0.42 mmol) filtered through a column packed with cellite was put into the flask, and the flask was stirred at 25° C. for 12 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 98%).

TABLE 10

| | Monomer[1] | Precatalyst | [Ani] | Time (h) | Solvent | Mn | Mw | Mw/Mn[3] | Monomer ratio[4] | Yield (%)[5] |
|---|---|---|---|---|---|---|---|---|---|---|
| Example 34 | a + b (5:1) | B | BF$_4^-$ | 20 | Toluene/CH$_2$Cl$_2$ | Not measured[2] | | | | 82 |
| Example 35 | a + b (5:1) | C | BF$_4^-$ | 20 | Toluene/CH$_2$Cl$_2$ | Not measured[2] | | | | 98 |
| Example 36 | a + b (5:1) | C | SbF$_6^-$ | 12 | Chlorobenzene | Not measured[2] | | | | 98 |
| Comparative Example 13 | a + b (5:1) | A | BF$_4^-$ | 20 | Toluene/CH$_2$Cl$_2$ | Not measured[2] | | | | 80 |

[1] numbers in parentheses represent a molar ratio of monomer a and monomer b (a ratio of end:exo in monomer b is 5:95)
[2] not dissolved in tetrahydrofuran
[3] measured by GPC using standard polystyrene
[4] measured using NMR
[5] yield after completely separated

EXAMPLE 37

Copolymerization of norbornene (monomber a) and 5-norbornene-2-carboxylic acid butylester (monomer c) (5:1)

Norbornene (4 g, 42.5 mmol), 5-norbornene-2-carboxylic acid butylester (1.2 ml, 8.5 mmol), and toluene (14 ml) were put into a 100 ml Schlenk flask. The precatalyst B and silver tetrafluoroborate (AgBF$_4$) were dissolved in 5 ml of a mixed solution of methylene chloride and toluene (1:1) in a glove box, and the reaction mixture was stirred for one hour. Then, the palladium catalyst (0.42 mmol) filtered through a column packed with cellite was put into the flask, and the flask was stirred at 25° C. for 20 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 74%).

EXAMPLE 38

Copolymerization of norbornene (monomber a) and 5-norbornene-2-carboxylic acid butylester (monomer c) (5:1)

Norbornene (4 g, 42.5 mmol), 5-norbornene-2-carboxylic acid butylester (1.2 ml, 8.5 mmol), and toluene (14 ml) were put into a 100 ml Schlenk flask. The precatalyst C and silver hexafluoroantimonate (AgSbF$_6$) were dissolved in 5 ml of chlorobenzene in a glove box, and the reaction mixture was stirred for one hour. Then, the palladium catalyst (0.42 mmol) filtered through a column packed with cellite was put into the flask, and the flask was stirred at 25° C. for 12 hours. Then, the resultant solution was added to excess methanol to obtain a white copolymer precipitate. The precipitate was filtered through a glass funnel, and the recovered product was dried in a vacuum oven at 80° C. for 24 hours to give a polymer (yield: 89%).

EXAMPLE 39

A copolymer of norbornene and 5-norbornene-2-carboxylic acid butylester (5:1) was prepared in the same manner as in Example 37 using the same catalyst amount, polymerization time, anion, and polymerization solvent as in Example 37 and the precatalyst C as summarized in Table 11 below.

COMPARATIVE EXAMPLE 14

A copolymer of norbornene and 5-norbornene-2-carboxylic acid butylester (5:1) was prepared in the same manner as in Example 37 using the same catalyst amount, polymerization time, anion, and polymerization solvent as in Example 37 and the precatalyst A as summarized in Table 11 below.

($M_w$) of at least 5,000 (20,000 or more in Examples 17-18 and Comparative Example 4, 5,000 or more in Examples 19-20 and Comparative Example 5, 10,000 or more in Example 22 and Comparative Example 6, 40,000 or more in Example 25 and Comparative Example 8, 10,000 or more in Examples 26-27 and Comparative Example 10), unlike polymerization in the presence of a halogen-unsubstituted precatalyst (the precatalyst A). This shows that the performance of a halogen-substituted precatalyst is more excellent than that of a halogen-unsubstituted precatalyst. Such an enhancement in catalyst performance is attributed to the electronic effect of a ligand.

In detail, a catalyst coordinated with a carbene ligand having a functional group capable of providing the electronic

TABLE 11

| | Monomer[1] | Precatalyst | [Ani] | Time (h) | Solvent | Mn | Mw | Mw/Mn[3] | Monomer ratio[4] | Yield (%)[5] |
|---|---|---|---|---|---|---|---|---|---|---|
| Example 37 | a + c (5:1) | B | $BF_4^-$ | 20 | Toluene/$CH_2Cl_2$ | Not measured[2] | | | 93:7 (a:c) | 74 |
| Example 38 | a + c (5:1) | C | $SbF_6^-$ | 12 | Chlorobenzene | Not measured[2] | | | 90:10 (a:c) | 89 |
| Example 39 | a + c (5:1) | C | $BF_4^-$ | 20 | Toluene/$CH_2Cl_2$ | 19,797 | 38,092 | 1.92 | 92:8 (a:c) | 78 |
| Comparative Example 14 | a + c (5:1) | A | $BF_4^-$ | 20 | Toluene/$CH_2Cl_2$ | 18,416 | 34,349 | 1.87 | 93:7 (a:c) | 73 |

[1] numbers in parentheses represent a molar ratio of monomer a and monomer c (a ratio of end:exo in monomer c is 5:95)
[2] not dissolved in tetrahydrofuran
[3] measured by GPC using standard polystyrene
[4] measured using NMR
[5] yield after completely separated

COMPARATIVE EXAMPLE 15

The same experiment as in Example 11 was performed using [(allyl)PdCl]$_2$ instead of the precatalyst A. However, no reaction occurred. The experimental results are summarized in Table 12 below.

COMPARATIVE EXAMPLE 16

The same experiment as in Example 11 was performed without using the salt compound AgBF$_4$. However, no reaction occurred. The experimental results are summarized in Table 12 below.

effect of a ligand is used in a method of the present invention, thereby increasing the weight average molecular weight ($M_w$) or yield of a polymer, compared with the use of a catalyst having no electronic effect of a ligand.

In particular, considering that norbornene including a polar substituent generally has low reactivity, the preparation of a norbornene polymer having a higher yield and Mw of 5,000 or more in the presence of a metal catalyst complex according to the present invention is considered to have commercial importance.

For example, Sen, et al. [Organometallics 2001, Vol. 20, 2802-2812] produced an ester norbornene polymer by poly-

TABLE 12

| | Monomer | Precatalyst | [M]/precatalyst | [Ani] | Time (h) | Solvent | Mn | Mw | Mw/Mn[2] | Yield (%)[3] |
|---|---|---|---|---|---|---|---|---|---|---|
| Comparative Example 15 | a | [(allyl)PdCl]$_2$ | 100/1 | $BF_4^-$ | 20 | Toluene | Not measured[1] | | | 0 |
| Comparative Example 16 | a | A | 100/1 | — | 20 | Toluene | Not measured[1] | | | 0 |

[1] not dissolved in tetrahydrofuran
[2] measured by GPC using standard polystyrene
[3] yield after completely separated As can be seen in Examples 1-39 above, when an unsubstituted norbornene monomer or a polar functional group-containing norbornene monomer is homopolymerized or copolymerized with another monomer in the presence of a metal catalyst complex according to the present invention, in most polymerization reactions, an addition polymer is obtained in a high yield without a reduction in catalyst activity due to the polar functional group. Moreover, polymerization in the presence of a halogen-substituented precatalyst (the precatalyst B (—I) and the precatalyst C (—Br)) produces a polymer with a weight average molecular weight merization catalyzed by [(1,5-cyclooctadiene)(CH$_3$)Pd(Cl)] and cocatalyzed by phosphine (PPh$_3$) and [Na]$^+$[B(3,5-(CF$_3$)$_2$C$_6$H$_3$)$_4$]$^-$. However, in the experimental conditions wherein a ratio of a catalyst to a monomer is about 1/400, a polymerization yield was 40% or less and a molecular weight of a polymer was merely 6500.

U.S. Pat. No. 6,455,650 discloses a method of polymerizing a functionalized norbornene-based monomer in the presence of a catalyst complex represented by [(R')$_z$M(L')$_x$(L")$_y$]$_b$[WCA]$_d$ where phosphine and a hydrocarbyl (e.g., allyl)-containing hydrocarbon are used as ligands. In this case, however, polymerization of a polar functional group (e.g., carbonyl)-containing norbornene monomer resulted in a very low yield of 5%.

Thermal Stability Test (TGA)

Figure 2:
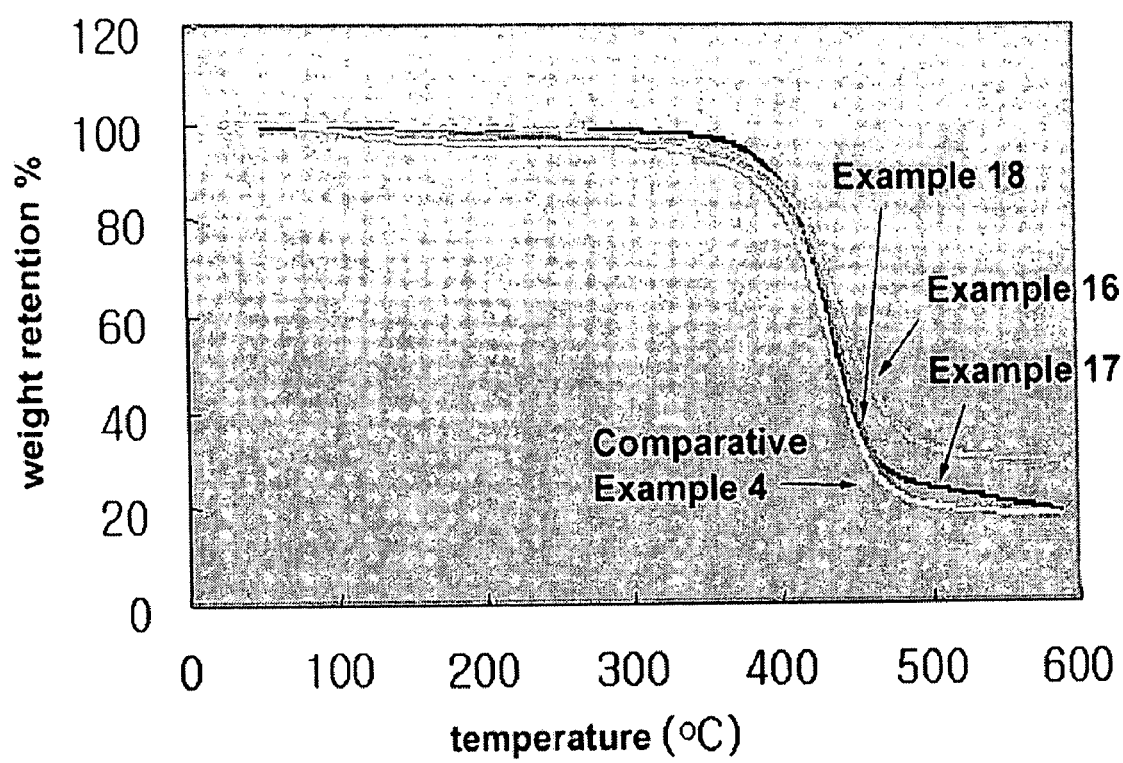
FIG. 2 is a TGA (ThermoGravimetric Analysis) graph of norbornene homopolymers prepared in Examples 16-18 and Comparative Example 4.

TGA of about 4.4-4.6 mg of polynorbornene 2-carboxylic acid methylester (exo:endo=50:50) was performed using a Perkin-Elmer TGA-7 by blowing nitrogen ($N_2$) at a flow rate of 5 ml/min at a heating rate of 10° C./min. The TGA results of the homopolymers prepared in Examples 16-18 and Comparative Example 4 are illustrated in FIG. 2. Referring to FIG. 2, all the polymers exhibited good thermal stability with no change in weight at a temperature of 300° C. or more.

According to a method of preparing a cyclic olefin polymer of the present invention, a high molecular weight cyclic olefin addition polymer can be produced in a high yield even when using a polar functional group-containing cyclic olefin monomer. A polymer produced using the method shows good thermal stability.

What is claimed is:

1. A method of preparing a cyclic olefin polymer by addition polymerization of a cyclic olefin monomer, the method comprising contacting a metal catalyst complex represented by Formula 1 below with a cyclic olefin monomer represented by Formula 2 below:

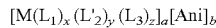   <Formula 1> wherein M is a Group X metal, $[M(L_1)_x(L'_2)_y(L_3)_z]$ is a cationic complex, $L_1$ is an anionic hydrocarbyl-containing ligand, $L'_2$ is a neutral ligand, $L_3$ is an N-heterocyclic carbene ligand,

[Ani] is an anion capable of weakly coordinating with the metal M, x is 1 or 2; y is 0 to 4; z is 1 or 2; $2 \leq x+y+z \leq 6$, a and b are respectively the number of cations and the number of anions capable of weakly coordinating with the metal M and are each a number of 1-10 which is used to satisfy the net charge balance of the metal catalyst complex, wherein for each of $L_1$, $L'_2$, and $L_3$, when a plurality of ligands are present in a molecule of the metal catalyst complex, the ligands may be the same or different, and

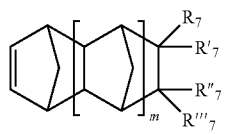   <Formula 2> wherein m is an integer of 0 to 4, $R_7$, $R'_7$, $R''_7$, and $R'''_7$ are each independently a polar functional group or a nonpolar functional group, and $R_7$, $R'_7$, $R''_7$, and $R'''_7$ may be connected to form a C4C12 saturated or unsaturated cyclic group or a C6C24 aromatic ring, wherein the nonpolar functional group is selected from the group consisting of hydrogen; halogen; C1C20 straight or branched alkyl, haloalkyl, alkenyl, or haloalkenyl; C3-C20 straight or branched alkynyl or haloalkynyl; C3C12 cycloalkyl which is unsubstituted or substituted by alkyl, alkenyl, alkynyl, halogen, haloalkyl, haloalkenyl, or haloalkynyl; C6C40 aryl which is unsubstituted or substituted by alkyl, alkenyl, alkynyl, halogen, haloalkyl, haloalkenyl, or haloalkynyl; and C7C15 aralkyl which is unsubstituted or substituted by alkyl, alkenyl, alkynyl, halogen, haloalkyl, haloalkenyl, or haloalkynyl, and wherein the polar functional group is a non-hydrocarbonaceous polar group comprising at least one of oxygen, nitrogen, phosphorus, sulfur, silicon, and boron, and is selected from the group consisting of:

—$R^8OR^9$, —$OR^9$, —$OC(O)OR^9$, —$R^8OC(O)OR^9$, —$C(O)R^9$, —$R^8C(O)R^9$, —$OC(O)R^9$, —$R^8C(O)OR^9$, —$C(O)OR^9$, —$R^8OC(O)R^9$, —$(R^8O)_k$—$OR^9$, —$(OR^8)_k$—$OR^9$, —$C(O)$—$O$—$C(O)R^9$, —$R^8C(O)$—$O$—$C(O)R^9$, —$SR^9$, —$R^8SR^9$, —$SSR^8$, —$R^8SSR^9$, —$S(=O)R^9$, —$R^8S(=O)R^9$, —$R^8C(=S)R^9$, —$R^8C(=S)SR^9$, —$R^8SO_3R^9$, —$SO_3R^9$, —$R^8N=C=S$, —$N=C=S$, —$NCO$, $R^8$—$NCO$, —$CN$, —$R^8CN$, —$NNC(=S)R^9$, —$R^8NNC(=S)R^9$, —$NO_2$, —$R^8NO_2$, —$P(R^9)_2$, —$R^8P(R^9)_2$, —$P(=O)$ $(R^9)_2$, —$R^8P(=O)$ $(R^9)_2$,

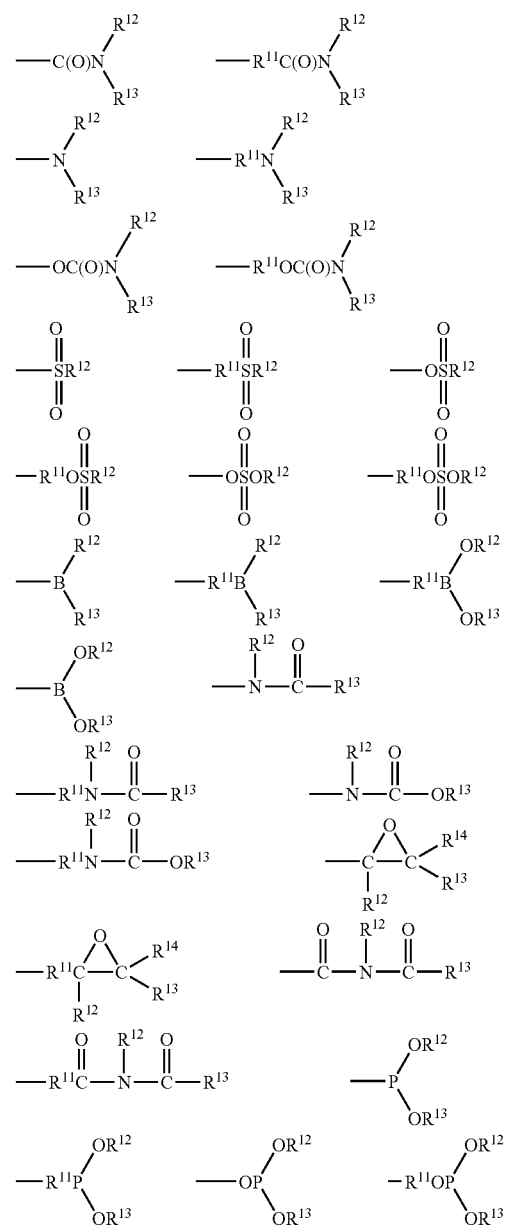

-continued

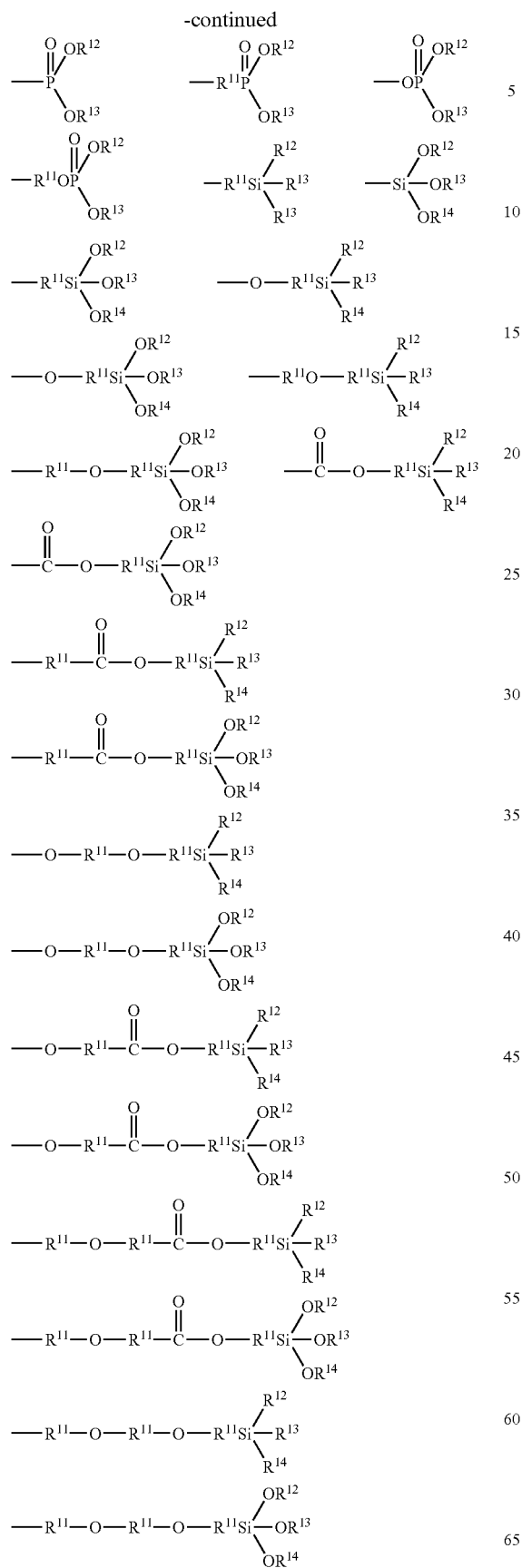

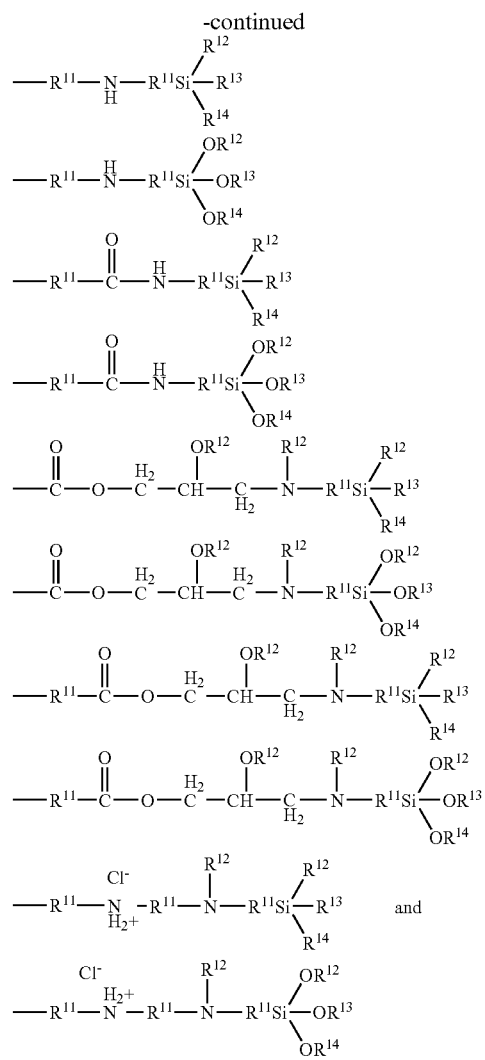

where $R^8$'s and $R^{11}$'s are each C1C20 straight or branched alkylene, haloalkylene, alkenylene, or haloalkenylene; C3C20 straight or branched alkynylene or haloalkynylene; C3-C12 cycloalkylene which is unsubstituted or substituted by alkyl, alkenyl, alkynyl, halogen, haloalkyl, haloalkenyl, or haloalkynyl; C6C40 arylene which is unsubstituted or substituted by alkyl, alkenyl, alkynyl, halogen, haloalkyl, haloalkenyl, or haloalkynyl; or C7C15 aralkylene which is unsubstituted or substituted by alkyl, alkenyl, alkynyl, halogen, haloalkyl, haloalkenyl, or haloalkynyl, $R^9$'s, $R^{12}$'s, $R^{13}$'s, and $R^{14}$'s are each hydrogen; halogen; C1C20 straight or branched alkyl, haloalkyl, alkenyl, or haloalkenyl; C3C20 straight or branched alkynyl or haloalkynyl; C3C12 cycloalkyl which is unsubstituted or substituted by alkyl, alkenyl, alkynyl, halogen, haloalkyl, haloalkenyl, or haloalkynyl; C6C40 aryl which is unsubsitutted or substituted by alkyl, alkenyl, alkynyl, halogen, haloalkyl, haloalkenyl, or haloalkynyl; C7C15 aralkyl which is unsubstituted or substituted by alkyl, alkenyl, alkynyl, halogen, haloalkyl, haloalkenyl, or haloalkynyl; or alkoxy, haloalkoxy, silyl, siloxy, aryloxy, haloaryloxy, carbonyloxy, or halocarbonyloxy, and k's are each an integer of 1 to 10.

2. The method of claim 1, wherein the N-heterocyclic carbene ligand is at least one selected from the group consisting of compounds represented by Formulae 3A through 3D below:

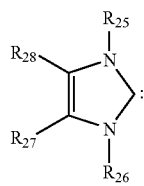
<Formula 3A>

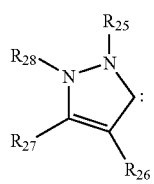
<Formula 3B>

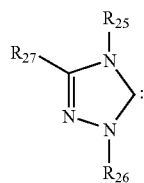
<Formula 3C>

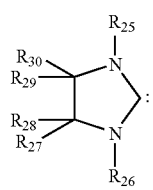
<Formula 3D> wherein $R_{25}$, $R_{26}$, $R_{27}$, $R_{28}$, $R_{29}$, and $R_{30}$ are each independently hydrogen, C1C20 straight or branched alkyl, C3C12 cycloalkyl, C2C20 straight or branched alkenyl, C6C15 cycloalkenyl, C3C20 straight or branched allyl, C6C30 aryl, C6C30 heteroatom-containing aryl, or C7C30 aralkyl, each of which is unsubstituted or substituted by at least one hydrocarbyl and/or heteroatom substituent selected from C1-C5 straight or branched alkyl or haloalkyl, C2-C5 straight or branched alkenyl or haloalkenyl, halogen, sulfur, oxygen, nitrogen, phosphorus, and a phenyl group which is unsubstituted or substituted by C1-C5 straight or branched alkyl or haloalkyl, halogen, or a heteroatom.

3. The method of claim 1, wherein [Ani] is an anion capable of weakly coordinating with the Group X metal M, and is one selected from the group consisting of borate, aluminate, [SbF$_6$]—, [PF$_6$]—, [AsF$_6$]—, perfluoroacetate [CF$_3$CO$_2$]—, perfluoropropionate [C$_2$F$_5$CO$_2$]—, perfluorobutyrate [CF$_3$CF$_2$CF$_2$CO$_2$]—, perchlorate [ClO$_4$]—, p-toluenesulfonate [p-CH$_3$C$_6$H$_4$SO$_3$]—, [SO$_3$CF$_3$]—, boratabenzene, and carborane which is unsubstituted or substituted by halogen.

4. The method of claim 3, wherein the borate or the aluminate is an anion represented by Formula 4A or 4B below:

[M'(R$_{30}$)$_4$]  <Formula 4A>

[M'(OR$_{30}$)$_4$]  <Formula 4B> wherein M' is boron or aluminum, and $R_{30}$'s are each independently halogen; C1C20 straight or branched alkyl or alkenyl which is unsubstituted or substituted by halogen; C3C12 cycloalkyl which is unsubstituted or substituted by halogen; C6C40 aryl which is unsubstituted or substituted by halogen or hydrocarbon; C6C40, aryl which is substituted by C3C20 straight or branched trialkylsiloxy or C18C48 straight or branched triarylsiloxy; or C7C15 aralkyl which is unsubstituted or substituted by halogen or hydrocarbon.

5. The method of claim 1, wherein the metal catalyst complex is represented by Formula 5 below:

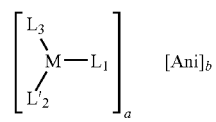
<Formula 5> wherein M, $L_1$, $L'_2$, $L_3$, [Ani], a, and b are as defined in claim 1.

6. The method of claim 1, wherein the metal catalyst complex is selected from compounds represented by Formulae 6A through 6D below:

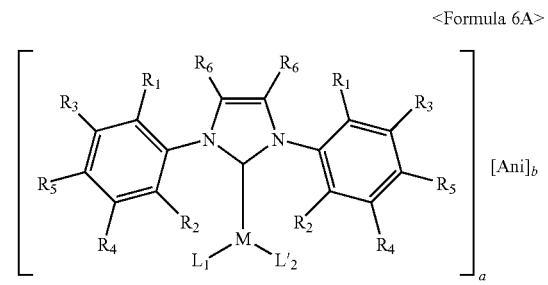
<Formula 6A>

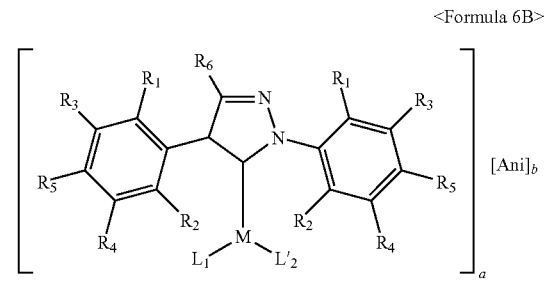
<Formula 6B>

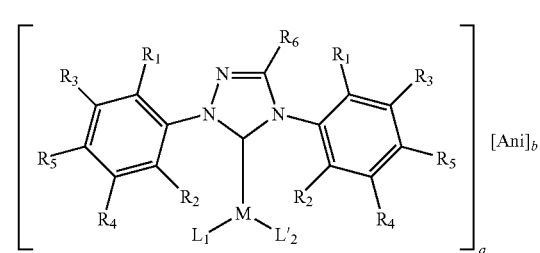
<Formula 6C>

-continued

<Formula 6D>

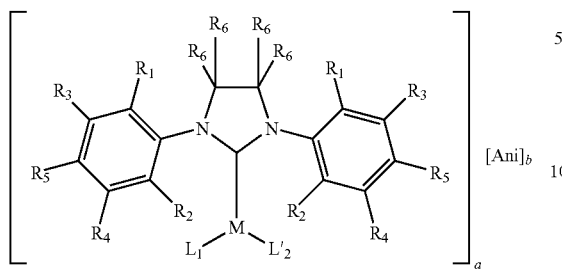

wherein M, $L_1$, $L'_2$, [Ani], a, and b are as defined in claim 1, and $R_1$ through $R_6$ are each independently hydrogen; halogen; C1C20 straight or branched alkyl, alkoxy, allyl, alkenyl or vinyl; C3C12 cycloalkyl which is unsubstituted or substituted by alkyl, alkenyl, alkynyl, halogen, haloalkyl, haloalkenyl, or haloalkynyl; C6C40 aryl which is unsubstituted or substituted by alkyl, alkenyl, alkynyl, halogen, haloalkyl, haloalkenyl, or haloalkynyl; C7C15 aralkyl which is unsubstituted or substituted by alkyl, alkenyl, alkynyl, halogen, haloalkyl, haloalkenyl, or haloalkynyl; or C3C20 alkynyl.

7. The method of claim 1, wherein the metal catalyst complex is represented by Formula 7 below:

<Formula 7>

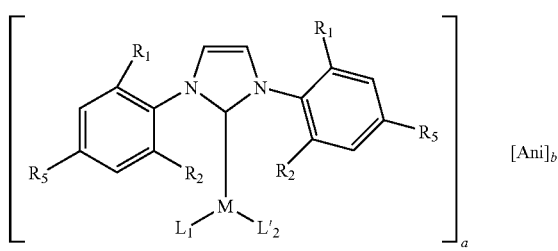

wherein M, $L_1$, $L'_2$, [Ani], a, and b are as defined in claim 1, and $R_1$, $R_2$, and $R_5$ are each independently hydrogen; halogen; C1C20 straight or branched alkyl, alkoxy, allyl, alkenyl or vinyl; C3C12 cycloalkyl which is unsubstituted or substituted by alkyl, alkenyl, alkynyl, halogen, haloalkyl, haloalkenyl, or haloalkynyl; C6C40 aryl which is unsubstituted or substituted by alkyl, alkenyl, alkynyl, halogen, haloalkyl, haloalkenyl, or haloalkynyl; C7C15 aralkyl which is unsubstituted or substituted by alkyl, alkenyl, alkynyl, halogen, haloalkyl, haloalkenyl, or haloalkynyl; or C3C20 alkynyl.

8. The method of claim 1, wherein the metal catalyst complex is represented by Formula 8 below:

<Formula 8>

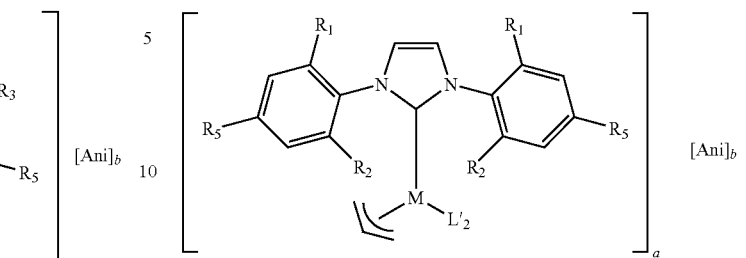

wherein M, $L'_2$, [Ani], a, and b are as defined in claim 1, $R_1$, $R_2$, and $R_5$ are each independently hydrogen; halogen; C1C20 straight or branched alkyl, alkoxy, allyl, alkenyl or vinyl; C3C12 cycloalkyl which is unsubstituted or substituted by alkyl, alkenyl, alkynyl, halogen, haloalkyl, haloalkenyl, or haloalkynyl; C6C40 aryl which is unsubstituted or substituted by alkyl, alkenyl, alkynyl, halogen, haloalkyl, haloalkenyl, or haloalkynyl; C7C15 aralkyl which is unsubstituted or substituted by alkyl, alkenyl, alkynyl, halogen, haloalkyl, haloalkenyl, or haloalkynyl; or C3C20 alkynyl, and

is C3 allyl.

9. The method of claim 1, wherein the metal catalyst complex is loaded on a microparticle support.

10. The method of claim 9, wherein the microparticle support is silica, titania, silica/chromia, silica/chromia/titania, silica/alumina, aluminum phosphate gel, silanized silica, silica hydrogel, montmorillonite clay, or zeolite.

11. The method of claim 1, wherein the metal catalyst complex is dissolved in an organic solvent selected from the group consisting of dichloromethane, dichloroethane, toluene, chlorobenzene, and a mixture thereof.

12. The method of claim 1, wherein the metal catalyst complex is introduced as a solid phase into a monomer solution.

13. The method of claim 1, wherein the cyclic olefin polymer is a cyclic olefin homopolymer having a polar functional group; a copolymer of cyclic olefin monomers having different polar functional groups; or a copolymer of a cyclic olefin monomer having a polar functional group and a cyclic olefin monomer having a nonpolar functional group.

14. The method of claim 1, wherein the cyclic olefin polymer has a weight average molecular weight ($M_w$) of 20,000 to 500,000.

* * * * *